United States Patent
Nakata et al.

(10) Patent No.: US 11,828,358 B2
(45) Date of Patent: Nov. 28, 2023

(54) TRANSMISSION MECHANISM DEVICE AND DRIVE DEVICE INCLUDING OIL CATCH TANK

(71) Applicant: NIDEC CORPORATION, Kyoto (JP)

(72) Inventors: Keisuke Nakata, Kyoto (JP); Yuki Ishikawa, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 17/685,270

(22) Filed: Mar. 2, 2022

(65) Prior Publication Data
US 2022/0282783 A1 Sep. 8, 2022

(30) Foreign Application Priority Data
Mar. 8, 2021 (JP) .................................. 2021-036668

(51) Int. Cl.
*F16H 57/04* (2010.01)

(52) U.S. Cl.
CPC ....... *F16H 57/0471* (2013.01); *F16H 57/045* (2013.01); *F16H 57/0423* (2013.01); *F16H 57/0424* (2013.01); *F16H 57/0476* (2013.01)

(58) Field of Classification Search
CPC ............ F16H 57/0423; F16H 57/0424; F16H 57/045; F16H 57/0457; F16H 57/0471; F16H 57/0476
See application file for complete search history.

(56) References Cited

U.S. PATENT DOCUMENTS

| 1,220,810 | A | * | 3/1917 | Alquist | F16H 57/0447 184/6.12 |
| 9,528,593 | B2 | * | 12/2016 | Tage | F16H 3/089 |
| 9,581,236 | B2 | * | 2/2017 | Tage | F16H 57/0431 |
| 11,114,921 | B2 | | 9/2021 | Ito et al. | |
| 11,486,486 | B2 | * | 11/2022 | Trinh | F16H 57/0423 |
| 2007/0175728 | A1 | * | 8/2007 | Aoyama | F16H 57/0423 192/112 |
| 2011/0214947 | A1 | * | 9/2011 | Tuomas | F16H 57/0494 184/6.12 |
| 2012/0145483 | A1 | * | 6/2012 | Araki | F16H 57/0423 184/6.12 |

(Continued)

FOREIGN PATENT DOCUMENTS

JP 5689049 B2 3/2015
JP 6351624 B2 7/2018

*Primary Examiner* — Minh Truong
(74) *Attorney, Agent, or Firm* — HAUPTMAN HAM, LLP

(57) ABSTRACT

A transmission mechanism device includes a transmission mechanism including gears, a first shaft, and a first bearing supporting the first shaft, a housing accommodating the transmission mechanism and having a first bearing holder portion on the inner face, oil collected in the lower region of the housing, and a catch tank disposed in the housing and opens upwards. The first bearing holder portion has a holding tubular portion that holds the first bearing from radially outside. The holding tubular portion has a cutout portion that connects the inside and outside of the holding tubular portion. A flow passage including a cutout portion is provided on the inner face of the housing. The catch tank includes a reservoir and a feed portion extending from the inside of the reservoir to the holding tubular portion. The distal end portion of the feed portion is inserted into the flow passage.

14 Claims, 8 Drawing Sheets

(56) References Cited

U.S. PATENT DOCUMENTS

| | | | |
|---|---|---|---|
| 2012/0286607 A1* | 11/2012 | Shimizu | F16H 57/0471 |
| | | | 310/90 |
| 2013/0283955 A1* | 10/2013 | Araki | F16H 57/043 |
| | | | 74/467 |
| 2017/0343100 A1* | 11/2017 | Kawarazaki | F16H 57/0435 |
| 2018/0163847 A1* | 6/2018 | Ahn | F16H 57/0424 |
| 2018/0216723 A1* | 8/2018 | Barillot | F16H 57/0457 |
| 2019/0145509 A1* | 5/2019 | Yu | F16H 57/0421 |
| | | | 184/11.1 |
| 2019/0299769 A1* | 10/2019 | Li | F16H 57/0424 |
| 2020/0018388 A1* | 1/2020 | Alexiou | F16H 57/0473 |

* cited by examiner

TRANSMISSION MECHANISM DEVICE AND DRIVE DEVICE INCLUDING OIL CATCH TANK

CROSS-REFERENCE TO RELATED APPLICATIONS

The present invention claims priority under 35 U.S.C. § 119 to Japanese Patent Application No. 2021-036668 filed on Mar. 8, 2021, the entire content of which is incorporated herein by reference.

FIELD OF THE INVENTION

The present invention relates to a transmission mechanism device and a drive device.

BACKGROUND

In recent years, the development of drive devices to be mounted on electric vehicles has been actively carried out. Oil is retained inside such a drive device, and the oil enhances the lubricity of the gears and bearings in the drive device. There is a structure in which a catch tank that receives oil scooped up by a gear is provided.

Some of the oil retained in the catch tank is supplied, for example, to bearings. In this case, there is a demand for a structure that efficiently supplies the oil in the catch tank to the bearing.

SUMMARY

A transmission mechanism device according to an aspect of the present invention includes a transmission mechanism including a plurality of gears, a first shaft, and a first bearing that supports the first shaft, a housing that accommodates the transmission mechanism and has a first bearing holder portion on the inner face, oil that is collected in the lower region of the housing, and a catch tank that is disposed in the housing and opens upwards. The first bearing holder portion has a holding tubular portion that holds the first bearing from radially outside. The holding tubular portion has a cutout portion that connects the inside and outside of the holding tubular portion. A flow passage including a cutout portion is provided on the inner face of the housing. The catch tank includes a reservoir and a feed portion extending from an inside of the reservoir to the holding tubular portion. The distal end portion of the feed portion is inserted into the flow passage.

Further, a drive device according to an aspect of the present invention includes the above-mentioned transmission mechanism device and a motor that transmits power to the transmission mechanism.

The above and other elements, features, steps, characteristics and advantages of the present disclosure will become more apparent from the following detailed description of the preferred embodiments with reference to the attached drawings.

DETAILED DESCRIPTION

Figure 1:
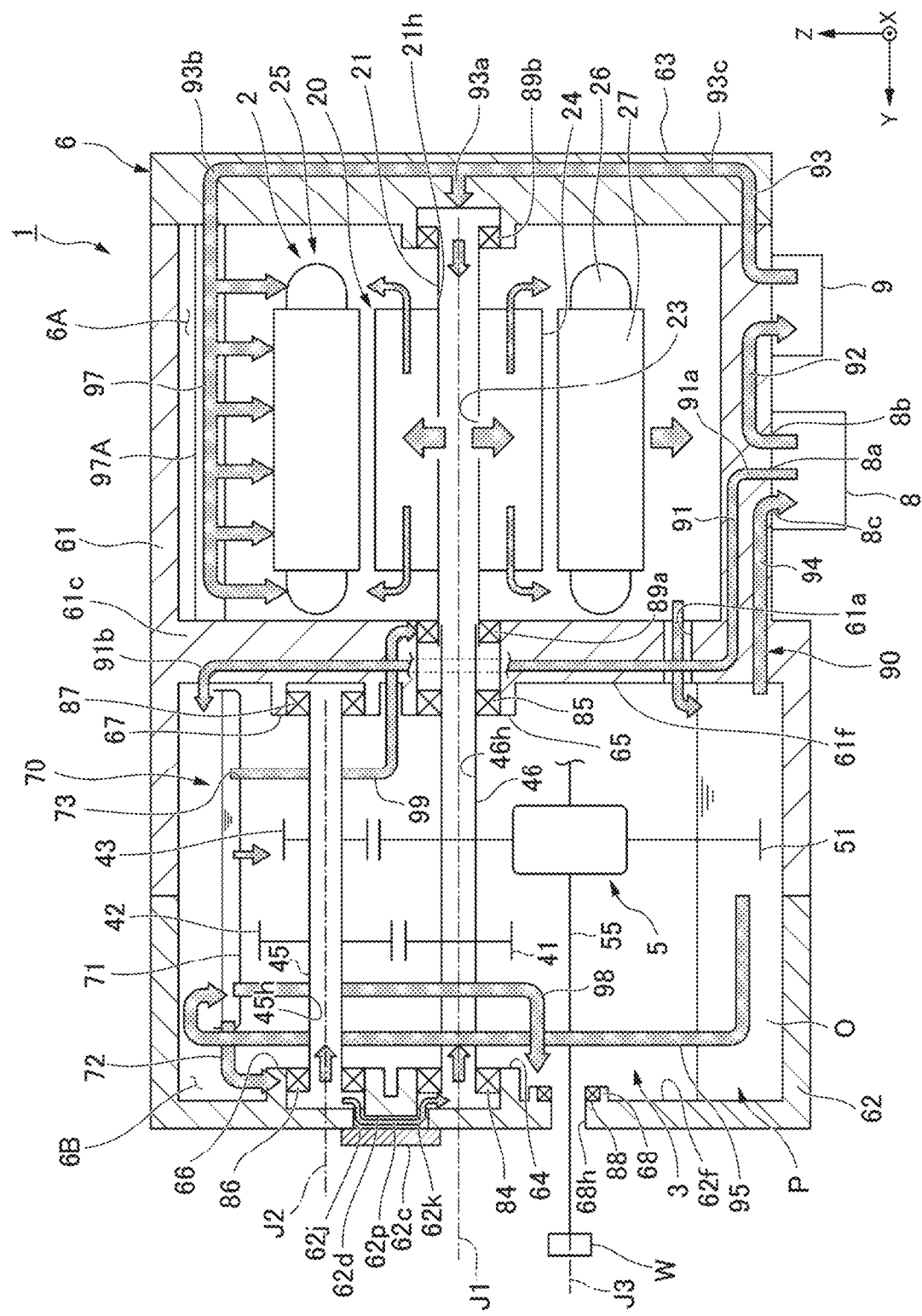
FIG. 1 is a conceptual view of a drive device of an embodiment.

A drive device according to an embodiment of the present invention will be described below with reference to the drawings. In description below, a vertical direction is defined based on a positional relationship when a drive device 1 of the present embodiment is mounted on a vehicle (not illustrated) positioned on a horizontal road surface.

In the drawings, an XYZ coordinate system is illustrated appropriately as a three-dimensional orthogonal coordinate system. In the XYZ coordinate system, a Z-axis direction is the vertical direction. A +Z side is an upper side in the vertical direction, and a −Z side is a lower side in the vertical direction. In the present embodiment, the upper side in the vertical direction will be referred to simply as the "upper side" and the lower side in the vertical direction will be simply referred to as the "lower side". An X-axis direction is a direction orthogonal to the Z-axis direction and is a vehicle front-rear direction on which the drive device 1 is mounted. In the present embodiment, a +X side is a front side of the vehicle, and a −X side is a rear side of the vehicle. A Y-axis direction is a direction orthogonal to both the X-axis direction and the Z-axis direction, and is a left-right direction of the vehicle, that is, a vehicle width direction. The Y-axis direction corresponds to the axial directions of a motor axis J1, a central axis J2, and an output axis J3, which will be described later. Each of the front-rear direction and the left-right direction is a horizontal direction perpendicular to the vertical direction. In the present embodiment, the +Y side corresponds to one side in the axial direction, and the −Y side corresponds to the other side in the axial direction.

The +X direction corresponds to the front side of a vehicle equipped with the drive device 1, and the −X direction corresponds to the rear side of the vehicle. However, the +X direction may correspond to the rear side of the vehicle, and the −X direction may correspond to the front side of the vehicle. That is, the front-rear direction of the drive device 1 does not necessarily coincide with the front-rear direction of the vehicle.

The motor axis J1, the central axis J2, and the output axis J3, which are appropriately shown in each figure, are parallel to each other and extend in the Y-axis direction (that is, the left-right direction of the vehicle and the direction along the horizontal plane). In the present embodiment, unless otherwise specified, a direction parallel to the central axis J2 is simply referred to as an "axial direction", a radial direction with the central axis J2 as a center is simply referred to as a "radial direction", and a circumferential direction with the central axis J2 as a center, that is, around the central axis J2 is simply referred to as a "circumferential direction". Note that, in the present embodiment, the "parallel direction" also includes a substantially parallel direction, and the "perpendicular direction" also includes a substantially perpendicular direction.

Further, in the present specification, the "distal end of the rib" means a distal end in the direction of protrusion from the wall face when the rib protrudes from the wall face.

Figure 2:
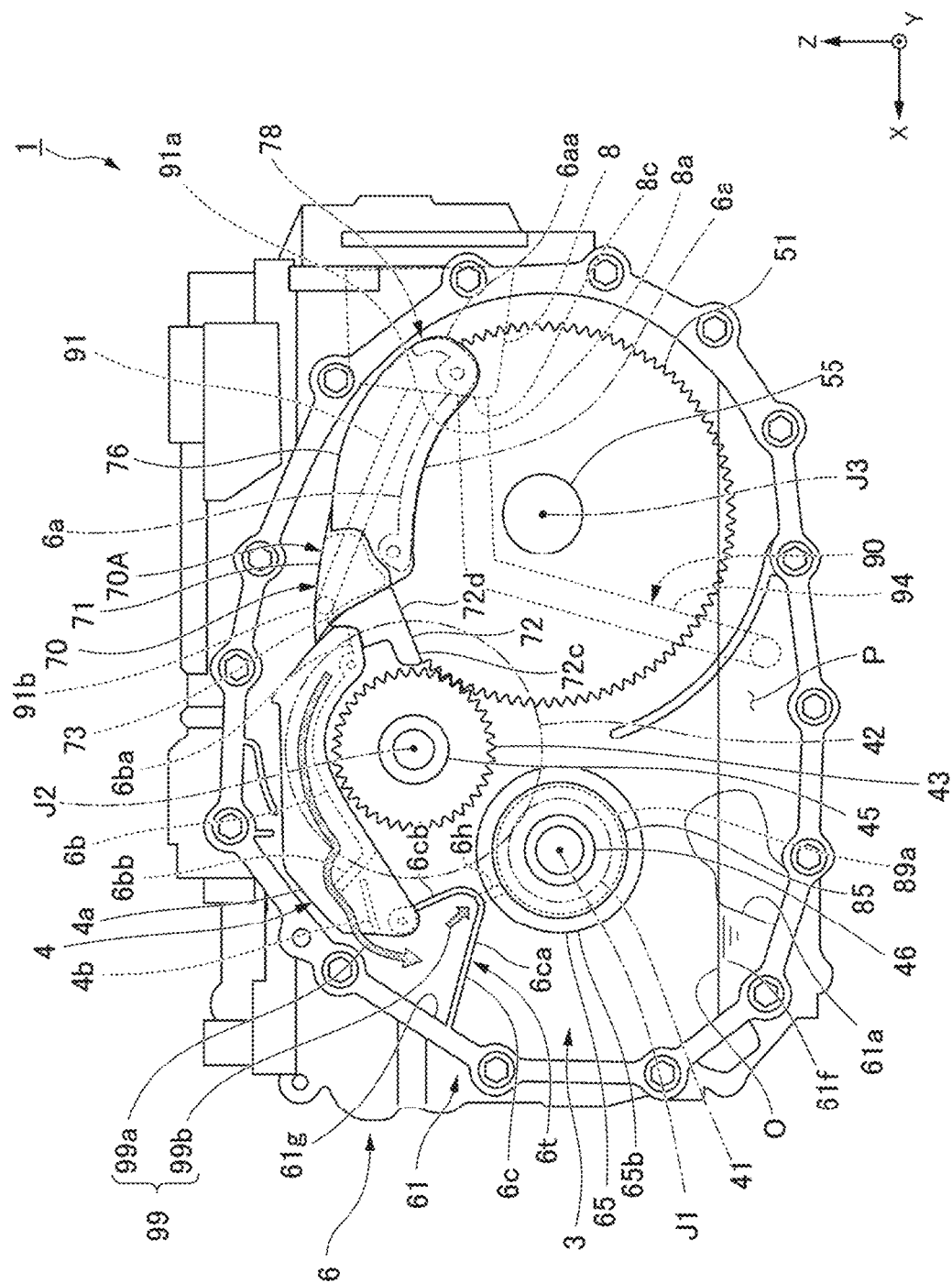
FIG. 2 is a plan view of a gear chamber of a drive device according to an embodiment.
Figure 3:
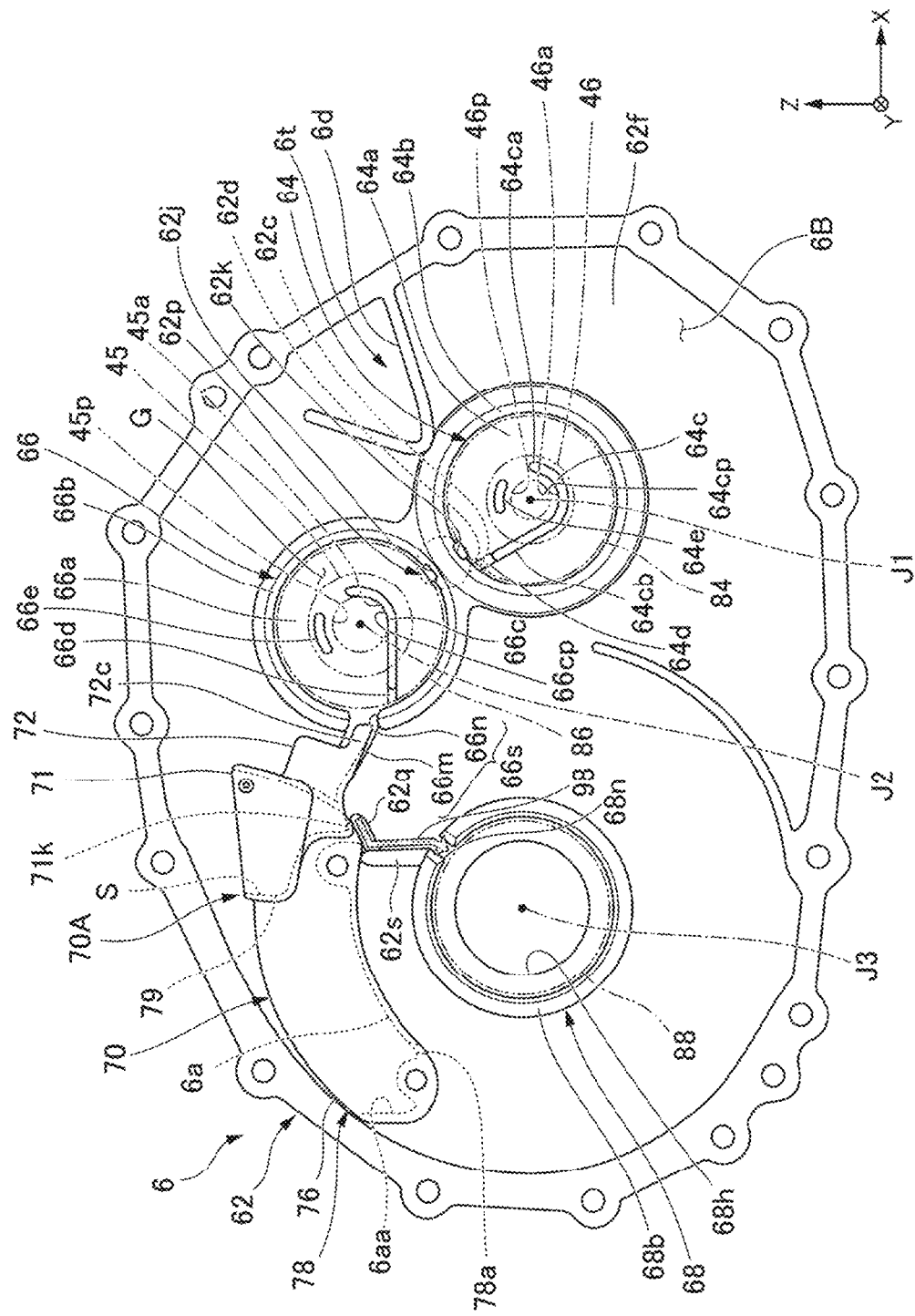
FIG. 3 is a rear view of a gear chamber of a drive device according to an embodiment.

FIG. 1 is a conceptual view of the drive device 1. FIG. 2 is a plan view of a gear chamber 6B of the drive device 1. FIG. 3 is a rear view of the gear chamber 6B of the drive device 1 when viewed from the direction opposite to that of FIG. 2.

The drive device 1 of the present embodiment is mounted on an electric vehicle (EV) and is used as a power source thereof. Note that, the drive device 1 may be mounted on a vehicle including a motor as a power source, such as a hybrid electric car (HEV) or a plug-in hybrid electric car (PHV).

As shown in FIG. 1, the drive device 1 includes a motor 2 and a transmission mechanism device 7 connected to the motor 2. The transmission mechanism device 7 includes a transmission mechanism 3, a housing 6, oil O, a catch tank 70, an oil pump 8, an oil cooler 9, and an oil passage 90. That is, the drive device 1 includes the motor 2, the transmission mechanism 3, the housing 6, the oil O, the catch tank 70, the oil pump 8, the oil cooler 9, and the oil passage 90. The drive device 1 may further include an inverter (not shown).

The housing 6 accommodates the motor 2, the transmission mechanism 3, the oil O, and the catch tank 70. The internal space of the housing 6 is partitioned into a motor chamber 6A that accommodates the motor 2 and a gear chamber 6B that accommodates the transmission mechanism 3 and the catch tank 70. Oil O flows across the motor chamber 6A and the gear chamber 6B. The gear chamber 6B is located on the other side (+Y side) of the motor chamber 6A in the axial direction.

The housing 6 includes a housing body 61, a motor cover 63 located on one side (−Y side) of the housing body 61 in the axial direction, and a gear cover 62 located on the other side (+Y side) of the housing body 61 in the axial direction. The housing body 61 and the motor cover 63 surround the motor chamber 6A. On the other hand, the housing body 61 and the gear cover 62 surround the gear chamber 6B.

The housing body 61 has a partition wall 61c that partitions the motor chamber 6A and the gear chamber 6B. The partition wall 61c extends along a plane orthogonal to the central axis J2. The partition wall 61c includes a partition wall opening 61a defined therein. The partition wall opening 61a penetrates the partition wall 61c and connects the motor chamber 6A and the gear chamber 6B.

The oil O is retained in the housing 6. Further, the oil O passes through the oil passage 90 and circulates in the housing 6. The oil O serves as a cooling refrigerant for the motor 2 and a lubricating oil for the transmission mechanism 3. An oil equivalent to a lubricating oil (ATF: Automatic Transmission Fluid) for an automatic transmission having a relatively low viscosity is preferably used as the oil O in order to perform functions of a lubricating oil and a cooling oil.

The gear chamber 6B is provided in its lower region with an oil reservoir P in which an oil O accumulates. That is, the oil O collects in the lower region (oil reservoir P) in the housing 6. The oil O in the oil reservoir P passes through the oil passage 90 and is sent to the motor chamber 6A. The oil O sent to the motor chamber 6A is dropped into the lower region of the motor chamber 6A, then moves to the gear chamber 6B through the partition wall opening 61a, and returns to the oil reservoir P.

The motor 2 is located on one side (−Y side) of the transmission mechanism 3 in the axial direction. The motor 2 includes a rotor 20 and a stator 25. In the present embodiment, the motor 2 is an inner rotor motor.

The rotor 20 rotates about a motor axis J1 extending in the horizontal direction. The rotor 20 has a hollow rotor shaft 21 and a rotor body 24. Although not illustrated in the drawings, the rotor body 24 includes a rotor core, and a rotor magnet fixed to the rotor core. A torque of the rotor 20 is transferred to the transmission mechanism 3. That is, the motor 2 transmits power to the transmission mechanism 3.

The rotor shaft 21 extends along the axial direction about the motor axis J1. The rotor shaft 21 rotates about the motor axis J1. A drive shaft 46 is connected to the end of the rotor shaft 21 on the other side in the axial direction. The rotor shaft 21 is a hollow shaft. The rotor shaft 21 has a hole 23 connecting a hollow portion 21h and the rotor core disposed radially outside of the rotor shaft 21.

The rotor shaft 21 is rotatably supported by a fifth bearing (rotor shaft bearing) 89a and a sixth bearing 89b. The fifth bearing 89a and the sixth bearing 89b are held on the inner side face surrounding the motor chamber 6A of the housing 6.

The stator 25 surrounds the rotor 20. The stator 25 is located radially outside of the rotor 20. An outer peripheral face of the stator 25 opposes an inner peripheral face of the housing 6. The stator 25 includes a stator core 27 and coils 26 attached to the stator core 27. The stator core 27 is fixed to an inner side face of the motor chamber 6A. The coil 26 is attached to each tooth portion of the stator core 27 with an insulator (not shown) therebetween.

The transmission mechanism 3 is housed in the gear chamber 6B of the housing 6. The transmission mechanism 3 is connected to the motor 2 to transmit the power of the motor 2. More specifically, the transmission mechanism 3 is connected on the other side of the rotor shaft 21 in the axial direction. That is, the motor 2 transmits power to the transmission mechanism 3.

The transmission mechanism 3 increases the torque output from the motor 2 in accordance with a moderating ratio while reducing the rotation speed of the motor 2. The transmission mechanism 3 includes a drive shaft (second shaft) 46, a first gear (pinion gear) 41, a counter shaft (first shaft) 45, a second gear (counter gear) 42, and a third gear 43, a differential device 5, an output shaft 55, a first bearing 86, a second bearing 84, a third bearing 85, a fourth bearing 87, and an output shaft bearing 88. The drive shaft 46 and the counter shaft 45 are hollow shafts, respectively. The drive shaft 46, the counter shaft 45 and the output shaft 55 extend in parallel with each other.

The drive shaft 46 and the first gear 41 are disposed around the motor axis J1. The drive shaft 46 extends in the axial direction of the motor axis J1. The drive shaft 46 has the other side end portion in the axial direction that protrudes inside the motor chamber 6A. The drive shaft 46 is connected to the rotor shaft 21 at the end portion on one side (−Y side) in the axial direction. The hollow portion 46h of the drive shaft 46 is connected to the hollow portion 21h of the rotor shaft 21. The first gear 41 is provided on the outer peripheral face of the drive shaft 46. The first gear 41 rotates about the motor axis J1 together with the drive shaft 46.

The counter shaft 45, the second gear 42, and the third gear 43 are disposed around the central axis J2 parallel to the motor axis J1. The counter shaft 45 extends along the axial direction of the central axis J2. That is, the counter shaft 45 extends in parallel with the drive shaft 46. The second gear 42 and the third gear 43 are provided to an outer peripheral face of the counter shaft 45 at intervals in the axial direction. The second gear 42 and the third gear 43 rotate around the central axis J2 together with the counter shaft 45. The second gear 42 meshes with the first gear 41. The third gear 43 meshes with the ring gear 51 of the differential device 5.

The differential device 5 includes a ring gear (transmission gear) 51, a gear housing (not shown), a pair of pinion gears (not illustrated), a pinion shaft (not shown), and a pair of side gears (not shown). Since the differential device 5 has the ring gear 51, the plurality of gears included in the transmission mechanism 3 includes the ring gear 51.

The differential device 5 meshes with the third gear 43 in the ring gear 51. The ring gear 51 rotates around the output axis J3 parallel to the motor axis J1. The differential device 5 is connected to the output shaft 55. The output shaft 55 extends along the output axis J3. The pair of output shafts 55 is each connected to the wheel W.

The torque output from the motor 2 is transmitted to the ring gear 51 of the differential device 5 via the rotor shaft 21, the drive shaft 46, the first gear 41, the second gear 42, the counter shaft 45 and the third gear 43, and further, is transmitted to the wheel W via the differential device 5, and the output shaft 55. The differential device 5 transmits a torque to output shafts 55 of left and right wheels while absorbing a difference in speed between the left and right wheels W when the vehicle turns. As described above, in the present embodiment, the transmission mechanism 3 transmits the torque of the motor 2 to the wheel W of the vehicle.

The first bearing 86 and the fourth bearing 87 are disposed around the central axis J2. The first bearing 86 and the fourth bearing 87 support the outer peripheral face of the counter shaft 45. The first bearing 86 supports the end of the counter shaft 45 on the other side (+Y side) in the axial direction. On the other hand, the fourth bearing 87 supports the end of the counter shaft 45 on one side (−Y side) in the axial direction.

The second bearing 84 and the third bearing 85 are disposed around the motor axis J1. The second bearing 84 and the third bearing 85 support the outer peripheral face of the drive shaft 46. The second bearing 84 supports the end of the drive shaft 46 on the other side (+Y side) in the axial direction. On the other hand, the third bearing 85 supports the end of the drive shaft 46 on one side (−Y side) in the axial direction.

Two output shaft bearings 88 are provided in the transmission mechanism 3. The two output shaft bearings 88 support different outer peripheral faces of the output shaft 55. Here, of the two output shaft bearings 88, only one located on the other side (+Y side) in the axial direction will be described. The output shaft bearing 88 is disposed around the output axis J3.

The first bearing 86, the second bearing 84, and the output shaft bearing 88 are held by the gear cover 62 of the housing 6. The gear cover 62 includes a first bearing holder portion 66 that holds the first bearing 86, a second bearing holder portion 64 that holds the second bearing 84, and an output shaft bearing holder portion 68 that holds the output shaft bearing 88.

The first bearing holder portion 66 and the second bearing holder portion 64 are located at a face (second inner side face 62*f*) facing one side in the axial direction of the faces of the housing 6 surrounding the gear chamber 6B. That is, the first bearing holder portion 66, the second bearing holder portion 64, and the output shaft bearing holder portion 68 are provided on the second inner side face (inner face) 62*f*. The housing 6 holds the first bearing 86, the second bearing 84, and the output shaft bearing 88 on the second inner side face 62*f*.

As shown in FIG. 3, the first bearing holder portion 66 has a first facing face 66*a* and a first holding tubular portion 66*b*. The first facing face 66*a* extends along a plane orthogonal to the axial direction. The first facing face 66*a* is a face facing the gear chamber 6B. The first facing face 66*a* faces the end face of the counter shaft 45 on the other side (+Y side) in the axial direction. The first holding tubular portion 66*b* protrudes from the first facing face 66*a* on one side (−Y side) in the axial direction. The first holding tubular portion 66*b* has a tubular shape with the central axis J2 as a center. The first holding tubular portion 66*b* holds the first bearing 86 from outside in the radial direction of the central axis J2.

The second bearing holder portion 64 has a second facing face 64*a* and a second holding tubular portion 64*b*. The second facing face 64*a* extends along a plane orthogonal to the axial direction. The second facing face 64*a* is a face facing the gear chamber 6B. The second facing face 64*a* faces the end face of the drive shaft 46 on the other side (+Y side) in the axial direction. The second holding tubular portion 64*b* protrudes from the second facing face 64*a* to one side (−Y side) in the axial direction. The second holding tubular portion 64*b* has a tubular shape with the motor axis J1 as a center. The second holding tubular portion 64*b* holds the second bearing 84 from outside in the radial direction of the motor axis J1.

The output shaft bearing holder portion 68 has an output shaft holding tubular portion 68*b*. The output shaft holding tubular portion 68*b* has a tubular shape with the output axis J3 as a center. The output shaft holding tubular portion 68*b* holds the output shaft bearing 88 from outside in the radial direction of the motor axis J1. A through hole 68*h* that penetrates the gear cover 62 is provided inside the output shaft holding tubular portion 68*b*. The output shaft 55 is inserted into the through hole 68*h*.

As shown in FIG. 1, the third bearing 85 and the fourth bearing 87 are held by the partition wall 61*c* of the housing 6. The partition wall 61*c* has a third bearing holder portion 65 that holds the third bearing 85 and a fourth bearing holder portion 67 that holds the fourth bearing 87.

The third bearing holder portion 65 and the fourth bearing holder portion 67 are located at a face (first inner side face 61*f*) facing the other side in the axial direction of the face of the housing 6 surrounding the gear chamber 6B. That is, the third bearing holder portion 65 and the fourth bearing holder portion 67 are provided on the first inner side face (inner side face) 61*f*. The housing 6 holds the third bearing 85 and the fourth bearing 87 on the first inner side face 61*f*. The other output shaft bearing (not shown) is also held on the first inner side face 61*f*.

As shown in FIG. 2, the third bearing holder portion 65 has a third holding tubular portion 65*b*. The third holding tubular portion 65*b* has a tubular shape with the motor axis J1 as a center. The third holding tubular portion 65*b* holds the third bearing 85 from radially outside.

Although description is omitted here, the fourth bearing holder portion 67 also has a holding tubular portion that holds the fourth bearing 87 from radially outside.

As shown in FIG. 1, the oil passage 90 supplies oil O from the oil reservoir P to the upper region of the motor chamber 6A and the upper region of the gear chamber 6B. The oil O that has passed through the oil passage 90 is supplied to the motor 2 and the transmission mechanism 3, respectively.

In this description, the "oil passage" means the path for the oil O. The "oil passage" is a concept including not only a "flow passage" that creates a steady unidirectional flow of the oil O, but also a path for the oil O that is scooped by the gear, a path for temporarily retaining the oil O, and a path for the oil O to drip off.

The oil pump 8, the oil cooler 9, and a supply pipe 97A are provided in the oil passage 90. The oil pump 8 and the oil cooler 9 are disposed on the outer peripheral face of the wall portion of the housing 6 surrounding the motor chamber 6A. The supply pipe 97A is disposed directly above the motor 2 in the gear chamber 6B.

The oil pump 8 is an electric pump driven by electricity. The oil pump 8 pumps the oil O in the oil passage 90. The oil pump 8 has one suction port 8c and two ejection ports (first ejection port 8a and second ejection port 8b). Therefore, the oil pump 8 branches the oil passage into two paths.

The oil cooler 9 cools the oil O in the oil passage 90. A refrigerant (not shown) flows inside the oil cooler 9. The oil cooler 9 is a heat exchanger that transfers the heat of oil O to the refrigerant.

The oil passage 90 has a suction path 94, a first path 91, a second path 92, a third path 93, an in-pipe path 97, and a scooping path 95. The suction path 94, the first path 91, the second path 92, and the third path 93 are holes provided in the housing 6. Therefore, the first path 91, the second path 92, and the third path 93 are formed by drilling a hole in the wall portion of the housing. On the other hand, the in-pipe path 97 is an internal path of the supply pipe 97A.

The suction path 94 connects the oil reservoir P of the gear chamber 6B and the oil pump 8. The upstream end of the suction path 94 opens to the oil reservoir P. On the other hand, the downstream end of the suction path 94 is connected to the suction port 8c of the oil pump 8.

The first path 91 connects the oil pump 8 and the catch tank 70. The first path 91 has a first end portion 91a located upstream with respect to the flow direction of the oil O, and a second end portion 91b located downstream. The first end portion 91a is connected to the first ejection port (ejection port) 8a of the oil pump 8. On the other hand, the second end portion 91b is connected to the catch tank 70.

According to the present embodiment, the first path 91 connecting the oil pump 8 and the catch tank 70 is configured by a hole provided in the wall portion of the housing 6. Therefore, it is not necessary to separately provide a pipe member between the oil pump 8 and the catch tank 70, and an increase in the number of parts can be suppressed. The structure of the connection portion between the first path 91 and the catch tank 70 will be described later.

As shown in FIG. 2, the first end portion 91a and the second end portion 91b of the first path 91 are located above the output axis J3. The first path 91 is located above the output axis J3 in its overall length. Further, the oil pump 8 and the first end portion 91a are disposed so as to overlap the ring gear 51 when viewed from the axial direction.

As will be described later, the catch tank 70 is disposed above the output axis J3 in order to supply the oil O to each gear and bearing in the gear chamber 6B. Therefore, the second end portion 91b connected to the catch tank 70 is disposed above the output axis J3. According to the present embodiment, by disposing the first end portion 91a above the output axis J3, the first end portion 91a can be disposed close to the catch tank 70 in the up-down direction (X-axis direction). As a result, the total length of the first path 91 can be shortened, and the pipeline resistance of the first path 91 can be reduced. Since the first path 91 is a hole provided in the housing 6, the wall portion of the housing 6 in which the first path 91 is provided is required to be thickened. According to the present embodiment, by shortening the total length of the first path 91, the region where the thickness is increased is shortened in the wall portion of the housing 6, and the weight of the housing 6 can be reduced as a whole.

As will be described later, the catch tank 70 is disposed directly above the ring gear 51 in order to efficiently receive the oil O scooped up by the ring gear 51. According to the present embodiment, the first end portion 91a overlaps the ring gear 51 when viewed from the Y-axis direction, so that the first end portion 91a can be disposed close to the catch tank 70 in a direction orthogonal to the up-down direction (front-rear direction of the vehicle, X-axis direction). As a result, the total length of the first path 91 can be shortened. Further, according to the present embodiment, when part of the oil pump 8 is disposed so as to overlap the ring gear 51 when viewed from the Y-axis direction, the projected area of the drive device 1 in the axial direction can be reduced, and the drive device 1 can be miniaturized.

In addition, in this specification, "directly above" means that they are disposed so as to overlap each other when viewed from above and the up-down direction. Therefore, the catch tank 70 is disposed above the ring gear 51 and overlaps the ring gear 51 when viewed from the up-down direction.

As shown in FIG. 1, the second path 92 supplies oil O from the oil pump 8 to the oil cooler 9. The upstream end of the second path 92 is connected to the second ejection port 8b of the oil pump 8. The downstream end of the second path 92 is connected to the oil cooler 9.

The third path 93 supplies the oil O from the oil cooler 9 to the motor 2. The third path 93 has a main path 93c, a first branch path 93a, and a second branch path 93b. The third path 93 is connected to the oil cooler 9 at the upstream end of the main path 93c. The third path 93 branches into the first branch path 93a and the second branch path 93b at the downstream end of the main path 93c. The first branch path 93a supplies the oil O to the hollow portion 21h of the rotor shaft 21 from one side (−Y side) in the axial direction of the rotor shaft 21. On the other hand, the second branch path 93b is supplied to the in-pipe path 97 above the motor 2 and inside the supply pipe 97A.

The oil O supplied to the stator 25 from the first branch path 93a to the hollow portion 21h of the rotor shaft 21 is scattered to the outside of the rotor shaft 21 from the hole 23 provided in the rotor shaft 21 through the rotor core by the centrifugal force of the rotor 20.

The oil O supplied from the first branch path 93a to the in-pipe path 97 inside the supply pipe 97A flows above the motor 2 along the axial direction. The supply pipe 97A has an injection hole that opens to the motor 2. The oil O in the in-pipe path 97 is injected into the stator 25 through the injection hole.

The oil O supplied to the stator 25 takes heat from the stator 25 as it travels along the surface of the stator 25 and cools the stator 25. Further, the oil O drops from the stator 25 and reaches the lower region of the motor chamber 6A. Further, the oil O in the lower region of the motor chamber 6A returns to the oil reservoir P of the gear chamber 6B via the partition wall opening 61a.

According to the present embodiment, part of the oil O pumped from the oil pump 8 is supplied into the gear chamber 6B via the first path 91. Further, part of the oil O pumped from the oil pump 8 is supplied to the motor chamber 6A via the second path 92, the oil cooler 9, and the third path 93. According to the present embodiment, the oil O can be used for cooling the motor 2 in the motor chamber 6A while being used for improving the lubricity of the transmission mechanism 3 in the gear chamber 6B.

In the present embodiment, it is preferable that the flow passage cross-sectional area of the first path 91 is smaller than the flow passage cross-sectional area of the second path 92. The oil O pumped from the oil pump 8 is branched and supplied to the first path 91 and the second path 92. Therefore, more oil O flows to one, of the first path 91 and the second path 92, which has the smaller pipeline resistance. According to the present embodiment, the pipeline resistance of the second path 92 can be made relatively small by making the flow passage cross-sectional area of the first path 91 smaller than the flow passage cross-sectional area of the second path 92. As a result, the flow rate of the oil O flowing in the second path 92 can be larger than that of the oil flowing in the first path 91, the amount of oil supplied to the motor 2 can be secured, and the temperature of the motor 2 is prevented from becoming too high.

The scooping path 95 is a path for scooping the oil O by the rotation of the ring gear 51 and guiding the oil O to the catch tank 70. The catch tank 70 is disposed in the housing 6 and opens upward. The oil O scooped up by the ring gear 51 is diffused in the gear chamber 6B, and part of the oil O is supplied to the catch tank 70. Of the oil O diffused in the gear chamber 6B, the oil O not received by the catch tank 70 is supplied to each gear in the gear chamber 6B and used for lubrication of the tooth face of the gear and the like.

The oil O of the catch tank 70 is supplied to the gear or bearing of the transmission mechanism 3. Further, the oil O is supplied to the catch tank 70 from the oil reservoir P via two paths (scooping path 95 and first path 91).

According to the present embodiment, the oil O is supplied to the catch tank 70 via the scooping path 95. The amount of oil O scooped up in the scooping path 95 increases according to the rotation speed of the ring gear 51. That is, the scooping path 95 is a path that allows an increase in the amount of oil O transferred as the rotation speed of the ring gear 51 increases. Since the ring gear 51 receives stirring resistance from the oil O of the oil reservoir P, the rotational efficiency of the ring gear 51 increases as the liquid level of the oil reservoir P decreases. According to the present embodiment, since the oil passage 90 has the scooping path 95, the liquid level of the oil reservoir P can be lowered when the rotation speed of the ring gear 51 increases and the rotation efficiency of the ring gear 51 can be improved. As a result, the transmission mechanism device 7 having excellent drive efficiency can be configured.

On the other hand, when the oil O path from the oil reservoir P to the catch tank 70 depends only on the scooping path 95, the amount of oil O supplied to the catch tank 70 is insufficient when the rotation speed of the ring gear 51 is low. According to the present embodiment, the oil O can be supplied to the catch tank 70 by the first path 91 in addition to the scooping path 95. The first path 91 is a path for pumping the oil O by the oil pump 8. That is, the first path 91 is a path through which the oil O can be supplied to the catch tank 70 as needed regardless of the rotation of the ring gear 51. According to the present embodiment, since the oil passage 90 has the first path 91 as well as the scooping path 95, it is possible to suppress the shortage of the amount of oil in the catch tank 70, and the oil can be stably supplied to the transmission mechanism 3 via the catch tank 70.

In the present embodiment, the oil pump 8 is an electric pump. Therefore, the oil pump 8 can supply the oil O to the catch tank 10 without depending on the driving state of the gear. However, the oil pump 8 may be a mechanical pump connected to any shaft of the transmission mechanism 3. Even in this case, by supplying the oil O to the catch tank 70 through two paths (scooping path 95 and first path 91), even when the supply amount of each path is reduced, the supply amount can be secured as a whole. As a result, it is possible to prevent the oil O of the catch tank 70 from becoming insufficient.

As shown in FIG. 2, in the transmission mechanism 3 of the present embodiment, the central axis J2 is disposed above the motor axis J1. That is, the center of the counter shaft 45 is located above the center of the drive shaft 46 when viewed from the axial direction. As a result, in the drive device 1, the motor 2 can be lowered, and the center of gravity of the drive device 1 can be lowered. As a result, it is easy to stabilize the weight balance of the vehicle to which it is mounted. Further, when the drive device 1 includes an inverter, part of the inverter can be disposed above the motor 2, and the entire drive device 1 can be miniaturized. Further, by disposing the central axis J2 at a high position, the second gear 42 rotating around the central axis J2 can be away from the liquid level, and the stirring resistance can be prevented from being applied to the second gear 42.

On the other hand, when each axis is disposed in this way, the second gear 42 is located above the first gear 41 and is disposed away from the liquid level of the oil reservoir P. Therefore, the second gear 42 cannot scoop up the oil O. Therefore, in the conventional structure, the second gear 42 has to be disposed below the first gear 41, and the oil O has to be scooped up by the ring gear 51 and the second gear 42.

In the present embodiment, the oil O can be supplied from the oil reservoir P to the catch tank 70 by the first path 91 using the oil pump 8. Therefore, it was possible to adopt a structure in which the second gear 42 is away from the liquid level of the oil reservoir P while solving the oil shortage of the catch tank 70.

Figure 4:
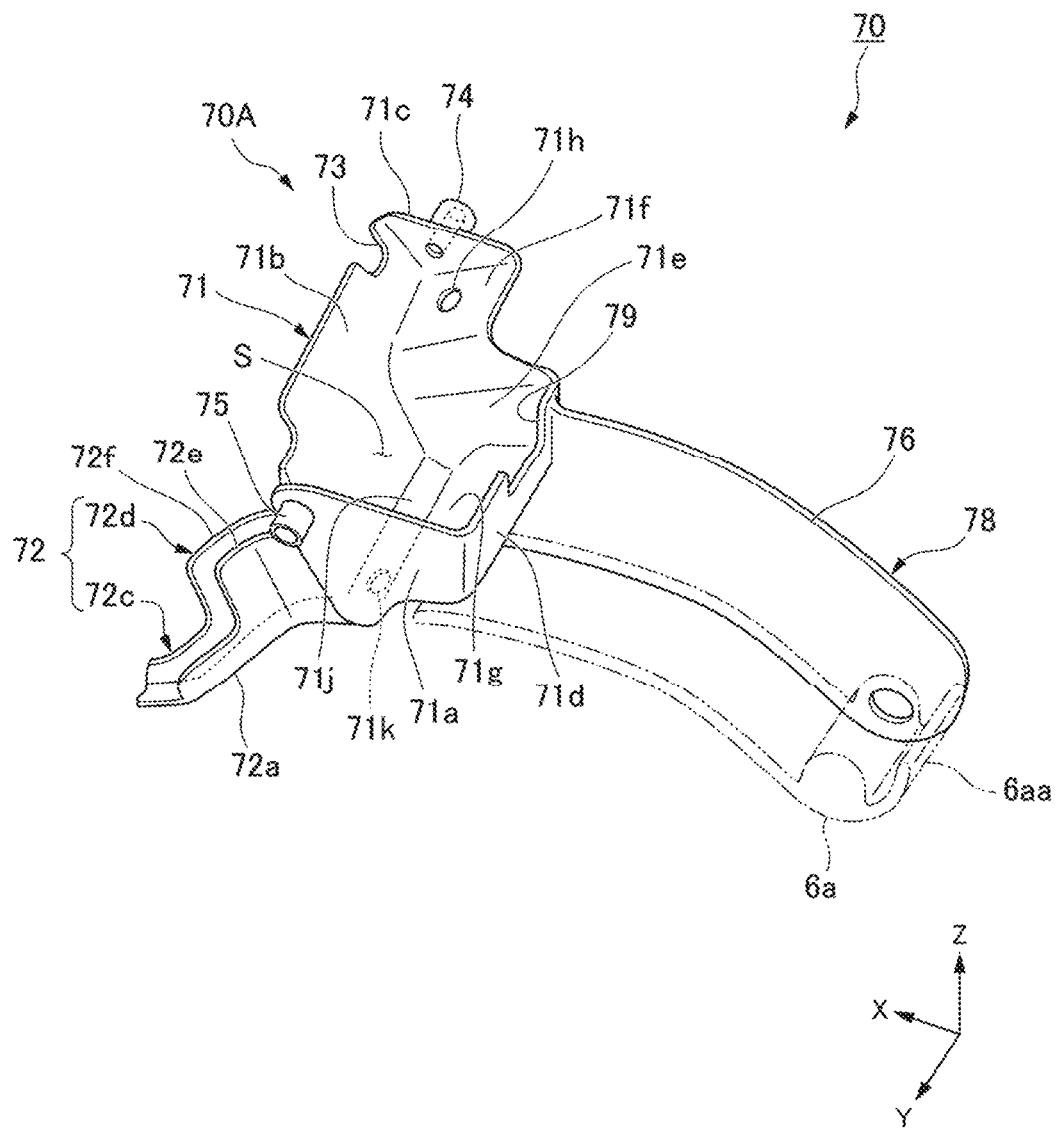
FIG. 4 is a perspective view of a catch tank according to an embodiment.
Figure 5:
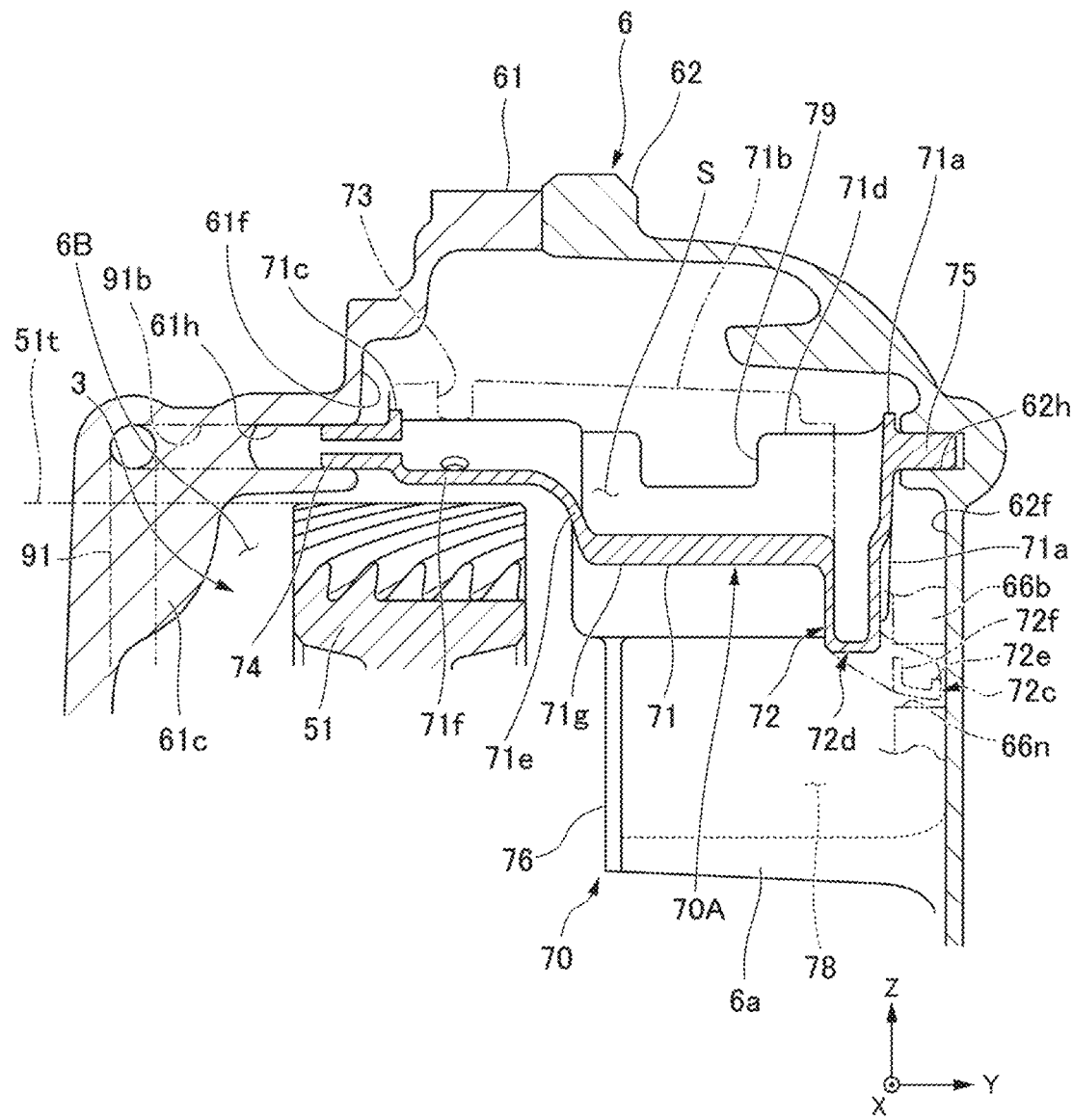
FIG. 5 is a partial cross-sectional view of the drive device according to an embodiment.

FIG. 4 is a perspective view of the catch tank 70. FIG. 5 is a partial cross-sectional view of the drive device 1 including the catch tank 70.

As shown in FIG. 4, the catch tank 70 includes a tank member 70A and a first protruding rib (rib) 6a of the housing 6. The first protruding rib 6a functions as the bottom portion of a sub-reservoir 78 as described later.

The tank member 70A includes a reservoir 71, a feed portion 72, a pipe portion 74, a fixing pin portion 75, and a covering plate 76. That is, the catch tank 70 has the reservoir 71, the feed portion 72, the pipe portion 74, and the covering plate 76.

The reservoir 71 has a box shape that opens upward. The reservoir 71 receives the oil O scooped up by the ring gear 51 and temporarily retains the oil O. The reservoir 71 has a retaining space S that retains the oil O. Further, the reservoir 71 includes a first wall portion (fixed wall portion) 71a, a second wall portion (side wall portion) 71b, a third wall portion 71c, a fourth wall portion 71d, and a stepped wall portion 71e, a first bottom portion 71f and a second bottom portion 71g surrounding the retaining space S. That is, the reservoir 71 has a plurality of wall portions including the first wall portion 71a and the second wall portion 71b.

The first wall portion 71a and the third wall portion 71c face each other in the axial direction (Y-axis direction). The second wall portion 71b and the fourth wall portion 71d face each other in the front-rear direction (X-axis direction) of the vehicle. The second wall portion 71b is connected to the first wall portion 71a and the third wall portion 71c. Similarly, the fourth wall portion 71d is connected to the first wall portion 71a and the third wall portion 71c.

As shown in FIG. 5, the first wall portion 71a faces the second inner side face 62f of the housing 6. The first wall portion 71a extends along the second inner side face 62f. The fixing pin portion 75 is provided on the first wall portion 71a. The fixing pin portion 75 protrudes from the outer face of the first wall portion 71a toward the second inner side face 62f. The second inner side face 62f has a fitting hole 62h into which the fixing pin portion 75 is inserted. As a result, the first wall portion 71a is fixed to the second inner side face 62f.

The third wall portion 71c faces the first inner side face 61f of the housing 6. The third wall portion 71c extends along the first inner side face 61f. The hollow pipe portion 74 is provided on the third wall portion 71c. The pipe portion 74 protrudes from the outer face of the third wall portion 71c toward the first inner side face 61f. The pipe portion 74 has a hollow portion. One end of the hollow portion of the pipe portion 74 opens to the retaining space S, and the other end opens to the outside of the retaining space S. On the other hand, the first inner side face 61f has a recess 61h in which the first path 91 of the oil passage 90 opens. The pipe portion 74 is inserted into the recess 61h. As a result, the third wall portion 71c is held by the second inner side face 62f. Further, the pipe portion 74 is connected to the first path 91. The hollow portion of the pipe portion 74 guides the oil O from the first path 91 to the catch tank 70.

According to the present embodiment, the catch tank 70 can be easily positioned with respect to the housing 6 by inserting the pipe portion 74 into the recess 61h. Further, since the pipe portion 74 is connected to the first path 91, the oil O of the first path 91 can be smoothly guided to the retaining space S of the catch tank 70.

In the present embodiment, a case where the pipe portion 74 is provided in the catch tank 70 and the first inner side face 61f of the housing 6 has the recess 61h is described. However, the pipe portion 74 may be provided on the first inner side face 61f, and the recess may be provided in the catch tank 70. That is, it suffices that one of the first inner side face 61f or the catch tank 70 has the pipe portion 74 protruding to the other and the recess 61h that fits into the pipe portion 74 is provided in the other. When the pipe portion 74 is provided on the first inner side face 61f, the hollow portion of the pipe portion 74 is connected to the first path 91 inside the wall of the housing 6.

The first bottom portion 71f and the second bottom portion 71g are located below the retaining space S. The oil O collects at the first bottom portion 71f and the second bottom portion 71g in the reservoir 71. The first bottom portion 71f and the second bottom portion 71g are disposed side by side in the axial direction (Y-axis direction) between the first wall portion 71a and the third wall portion 71c.

The first bottom portion 71f and the second bottom portion 71g have different vertical positions. The second bottom portion 71g is located below the first bottom portion 71f. The stepped wall portion 71e is disposed between the first bottom portion 71f and the second bottom portion 71g. The stepped wall portion 71e extends along a plane orthogonal to the axial direction and connects the first bottom portion 71f and the second bottom portion 71g.

The oil O retained in the reservoir 71 is supplied to each bearing of the transmission mechanism 3. Therefore, it is preferable that the reservoir 71 is disposed close to the motor axis J1, the central axis J2, and the output axis J3. According to the present embodiment, since the second bottom portion 71g is located below the upper end position 51t of the ring gear 51, the second bottom portion 71g can be disposed close to the motor axis J1, the central axis J2, and the output axis J3 in the up-down direction (Z-axis direction). As a result, the supply path for supplying the oil O that is collected in the reservoir 71 to each bearing can be shortened, and the oil O can be efficiently supplied from the catch tank 70 to each bearing.

According to the present embodiment, the second bottom portion 71g is located on the other side in the axial direction of the ring gear 51, and is disposed so as to overlap the ring gear 51 when viewed from the Y-axis direction. As a result, the second bottom portion 71g of the catch tank 70 is disposed below the upper end position 51t of the ring gear 51. As a result, the catch tank 70 can retain a large amount of oil O without increasing the size of the housing 6 in the height direction.

The first bottom portion 71f is disposed above the upper end position 51t of the ring gear 51 and overlaps the ring gear 51 when viewed from the up-down direction. Therefore, the reservoir 71 can efficiently receive the oil O scooped up by the ring gear 51. The second bottom portion 71g is located below the upper end position 51t of the ring gear 51. That is, the second bottom portion 71g is located below the first bottom portion 71f. Therefore, the oil O that is collected in the first bottom portion 71f flows into the second bottom portion 71g.

As shown in FIG. 4, the second wall portion 71b is disposed at the end portion of the first bottom portion 71f on the vehicle front side (+X side). On the other hand, the wall portion is not connected to the end portion of the first bottom portion 71f on the vehicle rear side (−X side). Therefore, the retaining space S above the first bottom portion 71f is open to the vehicle rear side (−X side). The oil O scooped up by the ring gear 51 is scattered to the vehicle front side (+X side) above the ring gear 51. According to the present embodiment, the oil O scooped up by the ring gear 51 passes above the first bottom portion 71f and hits the second wall portion 71b, so that the oil O is smoothly retained in the retaining space S.

The first bottom portion 71f inclines upward toward the vehicle rear side (−X side). As a result, it is possible to prevent the oil O in the retaining space S above the first bottom portion 71fg from flowing out from the end portion of the second bottom portion 71g on the vehicle rear side (−X side).

A second ejection hole 71h is provided in the first bottom portion 71f. The second ejection hole 71h opens directly above the ring gear 51. The second ejection hole 71h supplies the oil O in the retaining space S to the ring gear 51. When the vehicle is stopped for a long period of time, it is expected that the oil O on the tooth face of the ring gear 51 will be depleted. As described above, the oil O pumped to the oil pump 8 is supplied to the retaining space S via the first path 91. According to the present embodiment, by driving the oil pump 8, the oil O can be supplied to the tooth face of the ring gear 51 via the second ejection hole 71h, and the lubricity of the tooth face of the ring gear 51 can be ensured.

The second bottom portion 71g has a recessed groove 71j extending along the axial direction. The recessed groove 71j extends along the entire axial direction of the second bottom portion 71g. The first bottom portion 71f is disposed on one side (−Y side) in the axial direction of the recessed groove 71j. Further, the end portion of the recessed groove 71j on the other side (+Y side) in the axial direction is connected to the feed portion 72. According to the present embodiment, the second bottom portion 71g has the recessed groove 71j, so that the oil O flowing into the second bottom portion 71g from the first bottom portion 71f can be smoothly guided to the feed portion 72.

The second bottom portion 71g has a first ejection hole (first ejection portion) 71k. That is, the catch tank 70 has a first ejection hole 71k from which the oil O in the retaining space S is ejected. The first ejection hole 71k is disposed in the recessed groove 71j. That is, the first ejection hole 71k opens in the lowest region in the retaining space S. Therefore, the first ejection hole 71k preferentially ejects the oil O in the retaining space S.

The path of the oil O ejected from the first ejection hole 71k (first supply path 98) will be described. As shown in FIG. 3, a first guide rib 62s and a second guide rib 62q protruding on one side (−Y side) in the axial direction are provided on the second inner side face 62f of the housing 6. The first guide rib 62s and the second guide rib 62q are located below the catch tank 70.

The first guide rib 62s extends upward from the outer peripheral face of the output shaft holding tubular portion 68b when viewed from the axial direction. Further, the second guide rib 62q extends diagonally upward from slightly below the upper end portion of the first guide rib 62s toward directly below the reservoir 71 when viewed from the axial direction. The end portion of the second guide rib 62q on the vehicle front side (+X side) is located directly below the first ejection hole 71k. The protruding height of the second guide rib 62q is lower than the protruding height of the first guide rib 62s.

The output shaft holding tubular portion 68b has a cutout portion 68n connecting the inside and outside of the output shaft holding tubular portion 68b. The cutout portion 68n is located above the output axis J3. The cutout portion 68n is located at a side portion of the first guide rib 62s and below the first guide rib 62s.

The oil O ejected from the first ejection hole 71k of the reservoir 71 is received by the second guide rib 62q. The oil O received by the second guide rib 62q flows downward along the surface of the second guide rib 62q and reaches the first guide rib 62s. Further, this oil O overflows from the distal end of the second guide rib 62q to one side in the axial direction and flows to the lower side of the second guide rib 62q. This oil O flows downward along the surface of the first guide rib 62s and is guided to the cutout portion 68n of the output shaft holding tubular portion 68b. The oil O guided to the cutout portion 68n flows into the inside of the output shaft holding tubular portion 68b.

According to the present embodiment, the oil O retained in the reservoir 71 can be efficiently guided to the output shaft bearing 88 disposed inside the output shaft holding tubular portion 68b. As described above, in the internal space of the housing 6, a path (first supply path 98) for supplying the oil O ejected from the first ejection hole 71k to the output shaft bearing 88 is provided. The first supply path connects the first ejection hole 71k and the output shaft bearing 88. The first supply path 98 is composed of the first guide rib 62s, the second guide rib 62q, and the cutout portion 68n.

The first supply path does not necessarily have to be composed of the first guide rib 62s, the second guide rib 62q, and the cutout portion 68n. For example, the first supply path may be composed only of the first guide rib 62s and the cutout portion 68n. In this case, the oil O ejected from the first ejection hole 71k is supplied to the first guide rib 62s and then guided to the cutout portion 68n of the output shaft holding tubular portion 68b while traveling along the surface of the first guide rib 62s.

As shown in FIG. 4, the feed portion 72 of the catch tank 70 has a gutter shape having a bottom plate 72a and a pair of side plates 72e and 72f. The oil O flows through a gutter-shaped feed portion composed of the bottom plate 72a and the pair of side plates 72e and 72f. The feed portion 72 supplies the oil O retained in the reservoir 71 to the first bearing 86. The feed portion 72 extends from the second wall portion 71b of the reservoir 71 to the +X side, bends to the +Y side, and further extends to the +X side in an S-shape.

As shown in FIG. 3, the first holding tubular portion 66b of the first bearing holder portion 66 has a cutout portion 66n connecting the inside and outside of the first holding tubular portion 66b. The vertical position of the cutout portion 66n coincides with the vertical position of the central axis J2. Further, the second inner side face 62f of the housing 6 has a recess 66m recessed along the cutout portion 66n. The recess 66m has a groove shape extending radially outward of the central axis J2 from the cutout portion 66n. The recess 66m extends slightly upward as it moves away from the central axis J2. The recess 66m and the cutout portion 66n form a flow passage 66s connecting the inside and outside of the first holding tubular portion 66b. That is, the flow passage 66s including the cutout portion 66n is provided on the inner face of the housing 6. The flow passage 66s has the cutout portion 66n and the recess 66m.

The feed portion 72 of the catch tank 70 extends from the reservoir 71 to the first holding tubular portion 66b. Further, a distal end portion 72c of the feed portion 72 is inserted into the cutout portion 66n and the recess 66m of the first holding tubular portion 66b. That is, the distal end portion 72c is inserted into the flow passage 66s. The oil O in the reservoir 71 flows through the gutter-shaped feed portion 72 and flows out from the distal end portion 72c. According to the present embodiment, the distal end portion 72c of the feed portion 72 is inserted into the cutout portion 66n, so that the oil O flowing out from the distal end portion 12c is transferred through the cutout portion 66n and efficiently supplied to the inside of the first holding tubular portion 66b. As a result, the first bearing 86 disposed inside the first holding tubular portion 66b can be suitably lubricated.

In the present embodiment, the case where the distal end portion 72c is inserted into both the cutout portion 66n and the recess 66m constituting the flow passage 66s is described. However, the distal end portion 72c may be inserted only into the recess 66m. In this case, the oil O flowing out from the distal end portion 72c travels along the inner side face of the recess 66m and reaches the cutout portion 66n. Further, the distal end portion 72c may be inserted only into the cutout portion 66n. In this case, the second inner side face 62f of the housing 6 may not have the recess 66m.

The oil O guided to the inside of the first holding tubular portion 66b is supplied not only to the first bearing 86 but also to the hollow portion 45h of the counter shaft 45. Such a configuration will be described later.

As shown in FIG. 4, the feed portion 72 has the distal end portion 12c and a relay portion 72d. As mentioned above, the distal end portion 72c is located inside the cutout portion 66n. On the other hand, the relay portion 72d is disposed between the reservoir 71 and the distal end portion 72c, and connects the reservoir 71 to the distal end portion 72c.

The pair of side plates 72e and 72f constituting the feed portion 72 has different height dimensions between the relay portion 72d and the distal end portion 72c. The height of the side plates 72e and 72f is smaller at the distal end portion 72c than at the relay portion 72d. According to the present embodiment, in the feed portion 72, the pair of side plates 72e and 72f of the relay portion 72d is made to be relatively high, so that it is possible to prevent the oil O flowing through the feed portion 72 between the reservoir 71 and the cutout portion 66n from getting over the side plates 72e and 72f. On the other hand, since the distal end portion 72c is disposed inside the cutout portion 66n, even when the oil O gets over the side plates 72e and 72f of the distal end portion 72c, it is guided to the inside of the first holding tubular portion 66b and used for lubrication. Further, by making the pair of side plates 72e and 72f of the distal end portion 72c relatively low, the width dimension of the cutout portion 66n provided in a first holding tubular portion 166b into which the distal end portion 72c is inserted can be reduced. As a result, it is possible to suppress a decrease in the rigidity of the first holding tubular portion 66b due to the provision of the cutout portion 66n, and it is possible to improve the stability of holding the first bearing 86 by the first holding tubular portion 66b.

In the feed portion 72 of the present embodiment, the width dimension of the bottom plate 72a is uniform from the relay portion 72d to the distal end portion 72c. However, even when the width dimension of the bottom plate 72a of the distal end portion 72c is smaller than the width dimension of the bottom plate 72a of the relay portion 72d, the size of the cutout portion 66n can be suppressed. That is, the above-mentioned effect can be obtained when the distal end portion 72c is smaller than the relay portion 72d in at least one dimension of the width dimension of the bottom plate 72a and the height dimension of the side plates 72e and 72f.

Here, of the pair of side plates 72e and 72f, one is referred to as a first side plate 72e and the other is referred to as a second side plate 72f. The first side plate 72e and the second side plate 72f are disposed side by side along the axial direction at the distal end portion 72c. The second side plate 72f is located on one side (−Y side) in the axial direction with respect to the first side plate 72e.

As shown in FIG. 5, at the distal end portion 72c of the feed portion 72, the first side plate 72e faces the second inner side face 62f of the housing 6. That is, of the pair of side plates 72e and 72f, one located closer to the second inner side face 62f is the first side plate 72e, and the other is the second side plate 72f.

In the present embodiment, the height dimension of the first side plate 72e of the distal end portion 72c is smaller than the height dimension of the second side plate 72f. The distal end portion 72c is disposed in the cutout portion 66n. Therefore, the first side plate 72e is disposed on the bottom side of the cutout portion 66n. Therefore, by making the height dimension of the first side plate 72e at the distal end portion 72c relatively low, the oil O can be supplied to the inner side of the cutout portion 66n, and the oil O can be supplied efficiently to the inside of the first holding tubular portion 66b through the cutout portion 66n. Furthermore, by making the distal end portion 72c smaller, the manufacturing cost of the catch tank 70 can be suppressed. On the other hand, by making the height dimension of the second side plate 72f at the distal end portion 72c relatively high, it is possible to prevent the oil O from spilling from the cutout portion 66n to one side (−Y side) in the axial direction, and the oil O can be efficiently guided inside the cutout portion 66n.

As shown in FIG. 5, the first wall portion 71a of the reservoir 71 extends along the second inner side face 62f of the housing 6 and is fixed to the second inner side face 62f via the fixing pin portion 75. Further, the feed portion 72 extends from the second wall portion 71b of the reservoir 71. Therefore, the first wall portion 71a can be disposed close to the second inner side face 62f as compared with the case where the feed portion 72 extends from the first wall portion 71a, and the reservoir 71 can be stably fixed to the second inner side face 62f.

As shown in FIG. 4, the second wall portion 71b has an ejection cutout portion (second ejection portion) 73. That is, the catch tank 70 has the ejection cutout portion 73. The ejection cutout portion 73 extends downward from the upper end edge of the second wall portion 71b. The ejection cutout portion 73 is disposed in a region on one side (−Y side) in the axial direction of the second wall portion 71b. When the liquid level reaches the ejection cutout portion 73, the oil O retained in the reservoir 71 overflows from the ejection cutout portion 73. That is, the oil O of the reservoir 71 is ejected from the ejection cutout portion 73.

The path of the oil O ejected from the ejection cutout portion 73 (second supply path 99) will be described. As shown in FIG. 2, the first inner side face 61f of the housing 6 has a second protruding rib 6b and a third protruding rib 6c that protrude to the other side (+Y side) in the axial direction. A covering member 4 is disposed on the other side (+Y side) in the axial direction of each of the second protruding rib 6b and the third protruding rib 6c. That is, the transmission mechanism device 7 has the covering member 4 disposed in the internal space of the housing 6.

The second protruding rib 6b is located above the central axis J2. The second protruding rib 6b extends along the front-rear direction (X-axis direction) of the vehicle. The second protruding rib 6b is curved in a bow shape so as to project upward along the circumferential direction of the central axis J2.

The second protruding rib 6b has a first end portion 6ba on the vehicle rear side (−X side) and a second end portion 6bb on the vehicle front side (+X side). The first end portion 6ba faces the catch tank 70 in the front-rear direction of the vehicle. The second protruding rib 6b inclines upward toward the catch tank 70 at the first end portion 6ba. The first end portion 6ba of the second protruding rib 6b is disposed directly below the ejection cutout portion 73 of the catch tank 70. The second end portion 6bb faces the third protruding rib 6c in the front-rear direction (X-axis direction) of the vehicle. The second protruding rib 6b inclines upward toward the third protruding rib 6c at the second end portion 6bb.

The covering member 4 has a main body plate portion 4a and a relay rib 4b. The main body plate portion 4a extends along a plane orthogonal to the axial direction. The main body plate portion 4a is located close to the distal end of the second protruding rib 6b. The main body plate portion 4a covers the upper region of the second protruding rib 6b. As a result, a flow passage, of the oil O, which is surrounded by the second protruding rib 6b, the first inner side face 61f, and the main body plate portion 4a and extends along the front-rear direction of the vehicle is provided.

The relay rib 4b protrudes from a face of the main body plate portion 4a on one side (−Y side) in the axial direction to one side in the axial direction. The distal end of the relay rib 4b faces the first inner side face 61f with a slight gap. The distal end of the relay rib 4b may come into contact with the first inner side face 61f.

The relay rib 4b extends along the front-rear direction (X-axis direction) of the vehicle. The relay rib is disposed on the vehicle front side (+X side) of the second protruding rib 6b. The relay rib 4b is located below the second end portion 6bb of the second protruding rib 6b. Further, the relay rib 4b overlaps the second end portion 6bb when viewed from the up-down direction. The oil O that flows out from the second end portion 6bb to the vehicle front side (+X side) is received by the relay rib 4b. The relay rib 4b inclines slightly toward the lower side toward the vehicle front side. As a result, the relay rib 4b allows the oil O to flow smoothly to the vehicle front side.

The third protruding rib 6c has a first piece 6ca and a second piece 6cb. The first piece 6ca and the second piece 6cb are disposed in a V shape when viewed from the axial direction. The first piece 6ca extends from a third inner side face 61g facing the vehicle rear side (−X side) of the housing 6 toward the vehicle rear side. The first piece 6ca inclines downward toward the vehicle rear side. The second piece 6cb extends upward from the end portion of the first piece 6ca on the vehicle rear side. The second piece 6cb inclines toward the vehicle front side (+X side) toward the upper side. A gap is provided between the upper end portion of the second piece 6cb and the third inner side face 61g of the housing 6. In this way, the third protruding rib 6c extends in a concave shape that opens upward.

As shown in FIG. 3, a fourth protruding rib 6d that protrudes on one side (−Y side) in the axial direction is provided on the second inner side face 62f. The fourth protruding rib 6d faces the third protruding rib 6c in the axial direction. The fourth protruding rib 6d has the same shape as the third protruding rib 6c. That is, the fourth protruding rib 6d extends in a concave shape that opens upward. The distal end of the fourth protruding rib 6d comes into contact with the third protruding rib 6c.

The third protruding rib 6c, the fourth protruding rib 6d, the first inner side face 61f, and the second inner side face 62f constitute a sub-tank portion 6t that opens upward. That is, the sub-tank portion 6t has the third protruding rib 6c, the fourth protruding rib 6d, the first inner side face 61f, and the second inner side face 62f.

As shown in FIG. 2, the sub-tank portion 6t is provided in the internal space of the housing 6. Further, the sub-tank portion 6t opens upward. The sub-tank portion 6t is located opposite the catch tank 70 with the counter shaft 45 interposed therebetween. Since the sub-tank portion 6t is located on the vehicle front side (+X side) of the ring gear 51, it can receive the oil O scattered by the ring gear 51.

The opening of the sub-tank portion 6t is located directly below the end portion of the relay rib 4b on the vehicle front side (+X side). The oil flows above the relay rib 4b toward the vehicle front side (+X side), and is retained in the sub-tank portion 6t.

An oil supply hole 6h opens at the bottom portion of the sub-tank portion 6t. The oil supply hole 6h penetrates the partition wall 61c of the housing body 61. Further, the lower end portion of the oil supply hole 6h is opened to the face, of the partition wall 61c, facing the motor chamber 6A. Further, the oil supply hole 6h on the motor chamber 6A side is located above the tubular bearing holding portion (not shown) that holds the fifth bearing 89a. The bearing holding portion has a cutout. Through the cutout, the oil O that has flowed into the motor chamber 6A side through the oil supply hole 6h is supplied to the fifth bearing 89a. As a result, the oil O retained in the sub-tank portion 6t passes through the oil supply hole 6h and is supplied to the fifth bearing 89a.

As described above, in the internal space of the housing 6, a second supply path 99 for supplying the oil O ejected from the ejection cutout portion 73 to the fifth bearing 89a is provided. The second supply path 99 is composed of the second protruding rib 6b, the third protruding rib 6c, the covering member 4, and the oil supply hole 6h. The second supply path 99 allows the oil O retained in the catch tank 70 to be supplied to the fifth bearing 89a located in the motor chamber.

Further, the second supply path 99 has a first sub-path 99a extending from the catch tank 70 to the sub-tank portion 6t and a second sub-path 99b extending from the sub-tank portion 6t to the fifth bearing 89a.

The first sub-path 99a is the oil O path surrounded by the second protruding rib 6b, the third protruding rib 6c, and the covering member 4. In the present embodiment, the counter shaft 45 is disposed between the drive shaft 46 and the output shaft 55 in the X-axis direction. The first sub-path 99a passes above the counter shaft 45. According to the first sub-path 99a of the present embodiment, the oil O can be transferred from the catch tank 70 to the sub-tank portion 6t by passing above the counter shaft 45.

The second sub-path 99b has the oil supply hole 6h. The second sub-path 99b supplies the oil O retained in the sub-tank portion 6t to the fifth bearing 89a. The second supply path 99 supplies the oil O from the sub-tank portion 6t to the fifth bearing 89a via the second sub-path 99b.

According to the present embodiment, the second sub-path 99b supplies the oil O temporarily retained in the sub-tank portion 6t to the fifth bearing 89a. Therefore, even when the amount of oil O ejected from the ejection cutout portion 73 of the catch tank 70 is unstable, the oil O retained in the sub-tank portion 6t compensates for this and the second supply path 99 the fifth allows the oil O to be stably supplied to the fifth bearing 89a.

As shown in FIG. 4, the catch tank 70 has the sub-reservoir 78 disposed on the vehicle rear side (−X side) of the reservoir 71. The sub-reservoir 78 has a first protruding rib (rib) 6a extending from the housing 6 and the covering plate 76 of the tank member 70A.

The fourth wall portion 71d is provided at the boundary between the reservoir 71 and the sub-reservoir 78. That is, the fourth wall portion 71d partitions the reservoir 71 and the sub-reservoir 78. The fourth wall portion 71d has a transfer cutout portion (outflow portion) 79 for allowing oil O to flow out from the reservoir 71 to the sub-reservoir 78. That is, the catch tank 70 has the transfer cutout portion 79.

The transfer cutout portion 79 extends downward from the upper end edge of the fourth wall portion 71d. The transfer cutout portion 79 is located above the bottom face of the reservoir 71. When the liquid level of the oil O retained in the reservoir 71 reaches the lower end of the transfer cutout portion 79, the oil O flows out to the sub-reservoir 78 via the transfer cutout portion 79.

The rotational efficiency of the ring gear 51 decreases due to the stirring resistance of the oil O when the liquid level of the oil reservoir P is high. Further, as the rotation speed of the ring gear 51 increases, the stirring resistance of the oil O increases. In addition, when the rotation speed of the ring gear 51 is high, the amount of oil O transferred in the scooping path 95 increases. That is, a configuration in which even when the amount of oil O transferred in the scooping path 95 increases as the rotation speed of the ring gear 51 increases, the oil O does not overflow from the catch tank 70 is required.

The catch tank 70 of the present embodiment allows part of the oil O retained in the reservoir 71 to be transferred to the sub-reservoir 78 when the liquid level of the oil O in the reservoir 71 exceeds a certain amount. According to the present embodiment, when the rotation speed of the ring gear 51 increases, the oil O scooped up by the ring gear 51 can be retained not only in the reservoir 71 but also in the sub-reservoir 78. Therefore, even when the rotation speed of the ring gear 51 increases and the amount of oil O transferred in the scooping path 95 increases, it is possible to prevent the rotation efficiency of the ring gear 51 from decreasing.

As shown in FIG. 3, a discharge port 78a is provided at the bottom portion of the sub-reservoir 78. The oil O retained in the sub-reservoir 78 is discharged from the discharge port 78a.

The bottom portion of the sub-reservoir 78 is configured by the first protruding rib 6a. The first protruding rib 6a that protrudes on one side (−Y side) in the axial direction is provided on the second inner side face 62f of the housing 6. The first protruding rib 6a has a rib body 6ab extending in the vehicle front-rear direction (X-axis direction) and a side end portion 6aa extending upward from the end portion of the rib body 6ab on the vehicle rear side (−X side). That is, the first protruding rib 6a protrudes from the second inner side face 62f of the housing 6 to one side (−Y side) in the axial direction.

The covering plate 76 extends along a plane orthogonal to the axial direction. That is, the covering plate 76 extends along the second inner side face 62f of the housing 6. Further, the covering plate 76 is disposed so as to face the second inner side face 62f. The covering plate 76 contacts the distal end of the first protruding rib 6a. The covering plate 76 covers a region above the first protruding rib 6a. As a result, the sub-reservoir 78 retains the oil O in the space surrounded by the covering plate 76, the second inner side face 62f, the first protruding rib 6a, and the fourth wall portion 71d.

As shown in FIG. 2, at least part of the sub-reservoir 78 of the present embodiment overlaps the ring gear 51 when viewed from the Y-axis direction. According to the present embodiment, it is possible to suppress the increase in size of the gear chamber 6B by providing the sub-reservoir 78, and as a result, the drive device 1 can be downsized. More specifically, by providing the sub-reservoir 78 below the upper end of the ring gear 51, it is possible to reduce the height of the drive device 1.

When it is attempted to overlap at least part of the sub-reservoir 78 with the ring gear 51 when viewed from the Y-axis direction, it is difficult in manufacturing to form the gutter-shaped sub-reservoir 78 only by the ribs protruding from the housing 6. Further, when the entire sub-reservoir 78 is a separate member from the housing 6, it is necessary to reduce the size of the sub-reservoir 78 in order to avoid buffering with the housing 6, so that the amount of oil that can be retained in the sub-reservoir 78 may be reduced. According to the present embodiment, at least part of the sub-reservoir 78 is an inner face of the housing 6, and at least part of the sub-reservoir 78 is a covering plate 76 disposed to face the inner face of the housing. More specifically, the bottom portion of the sub-reservoir 78 is configured by the first protruding rib 6a protruding from the housing 6. Therefore, the second inner side face 62f of the housing 6 serves as one of the wall faces surrounding the retaining space of the sub-reservoir 78, and the limited space of the gear chamber 6B is effectively used to secure the retaining amount of oil O of the sub-reservoir 78.

The catch tank 70 of the present embodiment is disposed in the feed portion 72 so as to overlap a gear such as the second gear 42. As a result, the distal end portion 72c of the feed portion 72 can be brought closer to the central axis J2 of the second gear 42, and the certainty of oil supply to the first bearing 86 around the central axis J2 by the feed portion 72 is enhanced.

According to the present embodiment, the catch tank 70 has the tank member 70A provided with the reservoir 71 and the feed portion 72. The tank member 70A, which is part of the catch tank 70, and the housing 6 are separate members. The tank member 70A, which is part of the catch tank 70, is fixed to the inner side face of the housing 6. According to the present embodiment, the degree of freedom in the configuration of the feed portion 72 is increased as compared with the case where the catch tank 70 is composed of only the ribs protruding from the housing 6. More specifically, when the catch tank is composed of only ribs protruding from the housing 6, even when the reservoir can be configured, it is difficult in manufacturing to configure the feed portion extending toward the bearing holder portion as in the present embodiment. By fixing the tank member 70A, which is a separate member, to the inner side face of the housing 6 as in the present embodiment, not only the catch tank 70 can be made into a complicated shape, but also the degree of freedom in the arrangement of the catch tank 70 can be enhanced.

Next, the path through which the oil O supplied from the feed portion 72 to the inside of the first bearing holder portion 66 passes will be described mainly with reference to FIG. 3. As described above, the first holding tubular portion 66b of the first bearing holder portion 66 has the cutout portion 66n. Further, the cutout portion 66n is connected to the oil passage 90 (FIG. 1) via the catch tank 70. That is, the oil O is supplied to the cutout portion 66n from the oil passage 90.

As shown in FIG. 3, the first bearing holder portion 66 has a first rib 66c, a second rib 66d, and a third rib 66e that are located inside the first holding tubular portion 66b and protrudes from the first facing face 66a to one side (−Y side) in the axial direction.

The first rib 66c extends in a concave shape that opens upward. The first rib 66c has a first end portion 66ca on the vehicle front side (+X side) and a second end portion 66cb on the vehicle rear side (−X side).

The first rib 66c curves in an arc shape about the central axis J2 from directly below the central axis J2 toward the first end portion 66ca. The first end portion 66ca of the first rib 66c is located slightly above the central axis J2. The first end portion 66ca is located at the uppermost end portion in the total length of the first rib 66c. That is, when viewed from the Y-axis direction, the first end portion 66ca is located at the upper end of the first rib 66c. Further, the first end portion 66ca is disposed radially inside relative to the inner peripheral face of the first holding tubular portion 66b. That is, the upper end of the first rib 66c (first end portion 66ca) faces the inner peripheral face of the first holding tubular portion 66b via a gap G.

Further, the first rib 66c extends linearly from directly below the central axis J2 toward the second end portion 66cb. The first rib 66c inclines slightly upward from directly below the central axis J2 toward the second end portion 66cb. The second end portion 66cb is disposed radially inside relative to the inner peripheral face of the first holding tubular portion 66b.

When viewed from the Y-axis direction, the lower end 66cp of the inner peripheral face of the first rib 66c is located below the upper end 45p of the inner peripheral face 45a of the counter shaft 45. Here, the inner peripheral face of the first rib 66c means a face facing the opening (upper side) of the first rib 66c extending in a concave shape. Further, in the present embodiment, the lower end 66cp of the inner peripheral face of the first rib 66c is located directly below the central axis J2.

The oil O is supplied from the oil passage 90 into the opening of the first rib 66c extending in a concave shape. Therefore, the oil O collects in the opening of the first rib 66c. According to the present embodiment, the lower end 66cp of the inner peripheral face of the first rib 66c is disposed below the upper end 45p of the inner peripheral face 45a of the counter shaft 45, so that the oil O that is collected in the opening of the first rib 66c can be smoothly guided to the inside of the counter shaft 45. The oil O introduced into the inner peripheral face 45a of the counter shaft 45 passes through the hollow portion 45h of the counter shaft 45, reaches an end portion of the counter shaft 45 on one side in the axial direction, and is used for lubrication of the fourth bearing 87 (see FIG. 1).

According to the present embodiment, the gap G is provided between the first end portion 66ca of the first rib 66c and the inner peripheral face of the first holding tubular portion 66b. Therefore, part of the oil O flowing into the opening of the first rib 66c can be supplied below the first rib 66c through the gap G between the first end portion 66ca and the first holding tubular portion 66b. The oil O flowing below the first rib 66c collects in the lower region inside the first holding tubular portion 66b and is supplied to the first bearing 86. That is, according to the present embodiment, the oil O flowing into the inside of the first holding tubular portion 66b from the oil passage 90 can be used to lubricate each component in a well-balanced manner. It should be noted that such an effect is obtained as long as at least one of one end portion of the first rib 66c in the extending direction (first end portion 66ca) or the other end portion in the extending direction (second end portion 66cb) when viewed from the axial direction faces the inner peripheral face of the first holding tubular portion 66b via the gap G. For example, one end portion (first end portion 66ca) of the first rib may face the inner peripheral face of the first holding tubular portion 66b via the gap G, and the other end portion (second end portion 66cb) may be connected to the inner peripheral face of the first holding tubular portion 66b. In this case, part of the oil O that is collected in the opening of the first rib 66c is retained in the lower region inside the first holding tubular portion 66b through the gap G and is supplied to the first bearing 86.

The second rib 66d connects the second end portion 66cb of the first rib 66c and the inner peripheral face of the first holding tubular portion 66b. The second rib 66d extends linearly. The second rib 66d is disposed on the extension line of the first rib 66c on the second end portion 66cb side. The second rib 66d is located below the cutout portion 66n. That is, the second rib 66d reaches the first rib 66c from under the cutout portion 66n at the inner peripheral face of the first holding tubular portion 66b. The second rib 66d has a lower protrusion height than the first rib 66c.

In the second rib 66d of the present embodiment, in order to connect the inner peripheral face of the first holding tubular portion 66b and the first rib 66c, the oil O that has flowed into the inside of the first holding tubular portion 66b from the cutout portion 66n can be efficiently guided into the opening of the first rib 66c. As a result, a sufficient amount of oil O can be introduced from the first rib 66c into the counter shaft 45.

According to the present embodiment, the second rib 66d has a lower protrusion height than the first rib 66c. Therefore, part of the oil O is dropped from the second rib 66d while reaching the opening of the first rib 66c along the upper side of the second rib 66d, and collects at the bottom portion of the first holding tubular portion 66b. As a result, it is used for lubrication of the first bearing 86.

The third rib 66e is disposed on the opening side of the first rib 66c. That is, the third rib 66e is located directly above the first rib 66c. The third rib 66e is located directly above the central axis J2. The third rib 66e extends in an arc shape about the central axis J2. The protruding height of the third rib 66e is equal to the protruding height of the first rib 66c.

Figure 6:
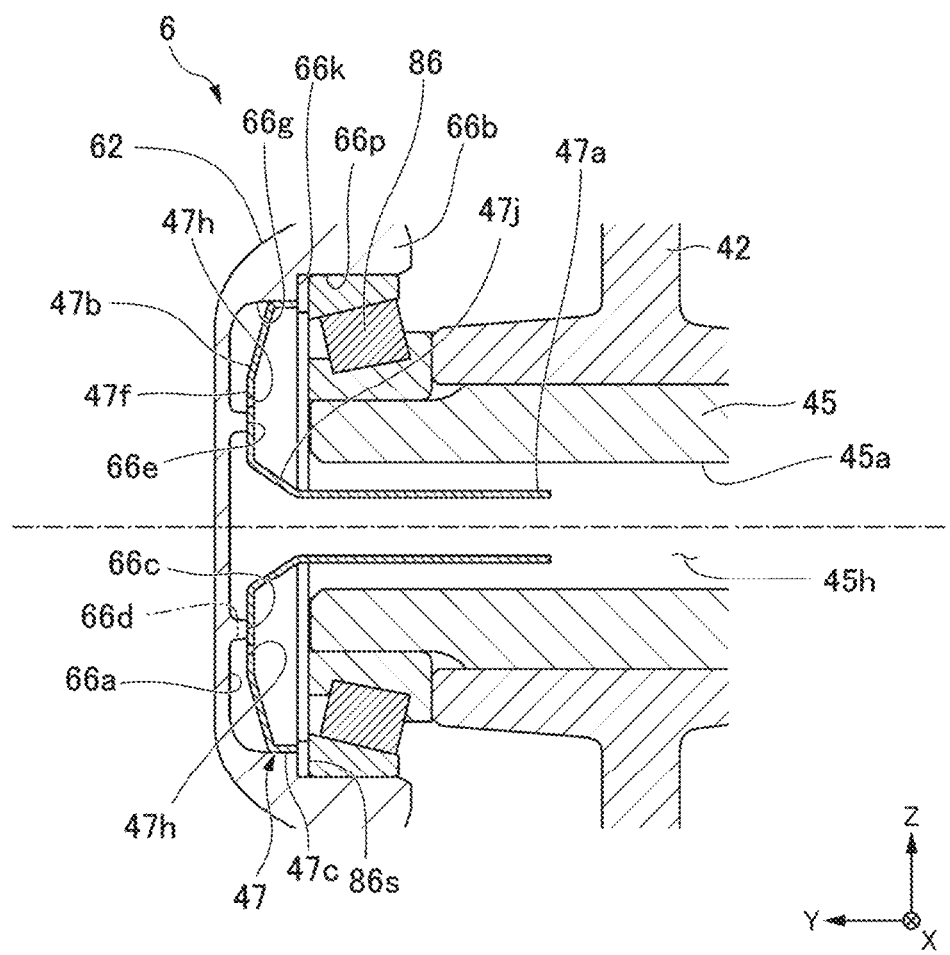
FIG. 6 is a partial cross-sectional view of the drive device according to an embodiment.

FIG. 6 is a partial cross-sectional view of the drive device 1 in the vicinity of the end portion of the counter shaft 45 on the other side (+Y) in the axial direction.

The inner peripheral face of the first holding tubular portion 66b has a stepped face 66k facing one side (−Y side) in the axial direction, a large diameter portion 66p located at one side in the axial direction relative to the stepped face 66k, and a small diameter portion 66q located at the other side in the axial direction relative to the stepped face 66k. The large diameter portion 66p surrounds and holds the first bearing 86 from the outside in the radial direction. A disk-shaped shim 86s is disposed between the first bearing 86 and the stepped face 66k.

The diameter of the small diameter portion 66q is smaller than the outer diameter of the first bearing 86. An oil guide 47 is disposed inside the small diameter portion 66q in the radial direction. That is, the transmission mechanism device 7 includes the oil guide 47 disposed inside the first holding tubular portion 66b.

The oil guide 47 has a tubular portion 47a, a flange portion 47b, and an outer ring tubular portion 47c. The tubular portion 47a has a tubular shape with the central axis J2 as a center. The tubular portion 47a extends along the axial direction. The end portion of the tubular portion 47a on one side (−Y side) in the axial direction is disposed inside the counter shaft 45 (hollow portion 45h). At the end portion of the tubular portion 47a on the other side (+Y side) in the axial direction, a tapered portion 47j whose diameter increases toward the other side in the axial direction is provided.

The flange portion 47b expands radially outward from the end portion of the tubular portion 47a on the other side (+Y side) in the axial direction. The flange portion 47b has a disk shape with the central axis J2 as a center. At least part of the flange portion 47b overlaps the first bearing 86 when viewed from the central axis J2 direction.

The flange portion 47b has a first face 47f facing the other side (+Y side) in the axial direction. The first face 47f faces the first facing face 66a. The first face 47f is in contact with the distal end faces of the first rib 66c and the third rib 66e or faces them through a slight gap. As a result, a gap through which the oil O passes is provided between the first face 47f and the first facing face 66a.

The flange portion 47b of the oil guide 47 has a plurality of through holes 47h penetrating in the axial direction. The through hole 47h is disposed at equal intervals along the circumferential direction. The through hole 47h allows part of oil O between the first face 47f and the first facing face 66a to pass to one side (−Y side) in the axial direction. As a result, part of the oil O that is collected in the first holding tubular portion 66b can be suitably supplied to the first bearing 86.

The outer ring tubular portion 47c extends from the outer edge of the flange portion 47b to one side (−Y side) in the axial direction. The outer ring tubular portion 47c has a tubular shape with the central axis J2 as a center. The outer diameter of the outer ring tubular portion 47c is slightly smaller than the inner diameter of the small diameter portion 66q. The distal end of the outer ring tubular portion 47c on one side in the axial direction is in contact with the shim 86s or faces the shim 86s through a slight gap. As a result, the oil guide 47 is disposed with some backlash in the axial direction between the first facing face 66a and the first bearing 86.

According to the present embodiment, since the flange portion 47b of the oil guide 47 covers the distal end of the first rib 66c, the oil O can be retained in the opening of the first rib 66c extending in a concave shape, and the oil O can be efficiently introduced into the hollow portion 45h of the counter shaft 45.

According to the present embodiment, since the oil guide 47 has the tubular portion 47a extending into the hollow portion 45h of the counter shaft 45, the oil O between the flange portion 47b and the first facing face 66a can be efficiently guided in the hollow portion 45h. According to the present embodiment, since the oil O and the tapered portion 47j at the end portion of the tubular portion 47a on the flange portion 47b side are provided, the oil O with which the other side (+Y side) in the axial direction of the flange portion 47b is filled can be smoothly guided into the tubular portion 47a.

According to the present embodiment, the flange portion 47b of the oil guide 47 is disposed between the distal end of the first rib 66c on one side (−Y side) in the axial direction and the first bearing 86 in the axial direction. As a result, the oil guide 47 can be prevented from tilting between the first facing face 66a and the first bearing 86, and the flow of oil O can be reliably controlled. Further, according to the present embodiment, the third rib 66e whose protrusion height coincides with the first rib 66c is provided on the opening side of the first rib 66c and opposite the first rib 66c with the central axis J2 interposed therebetween. The flange portion 47b is disposed axially between an end portion of each of the first rib 66c and the third rib 66e on one side in the axial direction and the first bearing 86. As a result, the inclination of the oil guide 47 can be suppressed more reliably.

As shown in FIG. 3, the second holding tubular portion 64b of the second bearing holder portion 64 is disposed below the first holding tubular portion 66b of the first bearing holder portion 66. The housing 6 has a communication hole (communication passage) 62p that connects the inside of the first holding tubular portion 66b and the inside of the second holding tubular portion 64b. The communication hole 62p opens to a region, of the inner peripheral face of the first holding tubular portion 66b, below the central axis J2. On the other hand, the communication hole 62p opens to a region, of the inner peripheral face of the second holding tubular portion 64b, above the motor axis J1.

According to the present embodiment, since the first holding tubular portion 66b and the second holding tubular portion 64b are connected to each other via a communication hole 62p, part of the oil O introduced inside the first holding tubular portion 66b can be guided to the inside of the second holding tubular portion 64b. As a result, not only the first bearing 86 but also the second bearing 84 can be suitably lubricated. According to the present embodiment, by supplying the oil O to the first bearing holder portion 66, it is possible to supply the oil O not only to the first bearing 86 but also to the second bearing 84.

The communication hole 62p has a recess 62d, a first through hole 62j, and a second through hole 62k. The recess 62d is provided on a face of the gear cover 62 (that is, the wall portion of the housing 6) on the other side (+Y side) in the axial direction. Further, the recess 62d is covered with a lid member 62c from the other side in the axial direction of the gear cover 62 (see FIG. 1). The first through hole 62j and the second through hole 62k each penetrate the gear cover 62. Further, the first through hole 62j connects the recess 62d and the inside of the first holding tubular portion 66b. On the other hand, the second through hole 62k connects the recess 62d and the inside of the second holding tubular portion 64b.

According to the present embodiment, the communication passage of the oil O connecting the first holding tubular portion 66b and the second holding tubular portion 64b is a hole-shaped communication hole 62p surrounded by a periphery. That is, the communication passage of the oil O is not a path that is not surrounded by a wall face such as a cutout or a recessed groove. Therefore, the communication hole 62p allows the oil O inside the first holding tubular portion 66b to reliably transfer to the inside of the second holding tubular portion 64b.

As shown in FIG. 1, the first through hole 62j and the second through hole 62k of the present embodiment penetrate the gear cover 62 in the Y-axis direction. Further, the recess 62d is recessed at a face of the gear cover 62 on one side (−Y side) in the axial direction toward the other side (+Y side) in the axial direction. When trying to form the communication hole 62p from one side of the gear cover 62 in the axial direction, it is necessary to insert a machining jig (drill, etc.) into the first holding tubular portion 66b or the second holding tubular portion 64b, causing a problem which requires a complex manufacturing process. According to the present embodiment, the communication hole 62p can secure a sufficient working space, and can be formed from the other side in the axial direction of the gear cover 62, so that the manufacturing process can be simplified.

Next, the path through which the oil O supplied from the communication hole 62p to the inside of the second bearing holder portion 64 passes will be described mainly with reference to FIG. 3. The second bearing holder portion 64 has a fourth rib 64c, a fifth rib 64d, and a sixth rib 64e which are located inside the second holding tubular portion 64b and protrudes one side in the axial direction from the second facing face 64a.

The fourth rib 64c extends in a concave shape that opens upward. The fourth rib 64c has a first end portion 64ca on the vehicle front side (+X side) and a second end portion 64cb on the vehicle rear side (−X side). The fourth rib 64c curves in an arc shape about the central axis J2 below the central axis J2. The first end portion 64ca and the second end portion 64cb are disposed radially inside of the inner peripheral face of the second holding tubular portion 64b. The first end portion 64ca and the second end portion 64cb of the fourth rib 64c face the inner peripheral face of the second holding tubular portion 64b via a gap. Further, the fifth rib 64d is connected to the second end portion 64cb.

When viewed from the axial direction, the lower end 64cp of the inner peripheral face of the fourth rib 64c is located below the upper end 46p of the inner peripheral face 46a of the drive shaft 46. According to the present embodiment, the lower end 64cp of the inner peripheral face of the fourth rib 64c is disposed below the upper end 46p of the inner peripheral face 46a of the drive shaft 46, so that the oil O that is collected in the opening of the fourth rib 64c can be smoothly introduced to the inside of the drive shaft 46. The oil O introduced into the inner peripheral face 46a of the drive shaft 46 passes through the hollow portion 46h of the drive shaft 46, reaches the end portion of the rotor shaft 21 on one side in the axial direction, and is used for lubrication of the sixth bearing 89b (see FIG. 1).

According to the present embodiment, a gap is provided between the first end portion 64ca of the fourth rib 64c and the inner peripheral face of the second holding tubular portion 64b. Therefore, part of the oil O flowing into the opening of the fourth rib 64c can be supplied below the fourth rib 64c through the gap between the first end portion 64ca and the second holding tubular portion 64b. The oil O flowing below the fourth rib 64c collects in the lower region inside the second holding tubular portion 64b to improve the lubricity of the second bearing 84. That is, according to the present embodiment, the lubricity of each component can be improved in a well-balanced manner by using the oil O that has flowed to the inside of the second holding tubular portion 64b from the oil passage 90.

The fifth rib 64d connects the second end portion 64cb of the fourth rib 64c and the inner peripheral face of the second holding tubular portion 64b. The fifth rib 64d extends linearly. The fifth rib 64d is disposed on an extension line of the fourth rib 64c on the second end portion 64cb side. The fifth rib 64d is located below the opening of the communication hole 62p. That is, the fifth rib 64d reaches the fourth rib 64c from under the opening of the communication hole 62p at the inner peripheral face of the second holding tubular portion 64b. The fifth rib 64d has a lower protrusion height than the fourth rib 64c.

In the fifth rib 64d of the present embodiment, in order to connect the inner peripheral face of the second holding tubular portion 64b and the fourth rib 64c, the oil O that has flowed into the inside of the second holding tubular portion 64b from the communication hole 62p can be efficiently guided into the opening of the fourth rib 64c. As a result, a sufficient amount of oil O can be introduced into the drive shaft 46 from the fourth rib 64c. Further, since the fifth rib 64d has a lower protrusion height than the fourth rib 64c, part of the oil O can be used for lubrication of the second bearing 84.

The sixth rib 64e is disposed on the opening side of the fourth rib 64c. That is, the sixth rib 64e is located directly above the fourth rib 64c. The sixth rib 64e is located directly above the central axis J2. The sixth rib 64e extends in an arc shape about the central axis J2. The protruding height of the sixth rib 64e is equal to the protruding height of the fourth rib 64c.

Although not shown, an oil guide 47 similar to that provided in the first bearing holder portion 66 is disposed between the second facing face 64a of the second bearing holder portion 64 and the second bearing 84 in the axial direction. The distal end of each of the fourth rib 64c and the sixth rib 64e comes into contact with the oil guide 47. As a result, the inclination of the oil guide 47 is suppressed. The oil guide 47 disposed inside the second bearing holder portion 64 guides the oil O to the inside of the drive shaft 46.

As shown in FIG. 1, according to the present embodiment, the end portion of the drive shaft 46 on one side (−Y side) in the axial direction is connected to the rotor shaft 21. Therefore, part of the oil O guided to the inside of the drive shaft 46 reaches the opening of the rotor shaft 21 on one side (−Y side) in the axial direction. This oil O is used to lubricate the sixth bearing 89b, which holds the end portion of the rotor shaft 21 on one side in the axial direction.

In the present embodiment, a case where the shaft connected to the rotor shaft 21 is a shaft (drive shaft 46) held by the second bearing holder portion 64 is described. However, the shaft connected to the rotor shaft 21 may be a shaft (counter shaft 45) held by the first bearing holder portion 66 to which the oil O is directly supplied from the catch tank 70.

Figure 7:
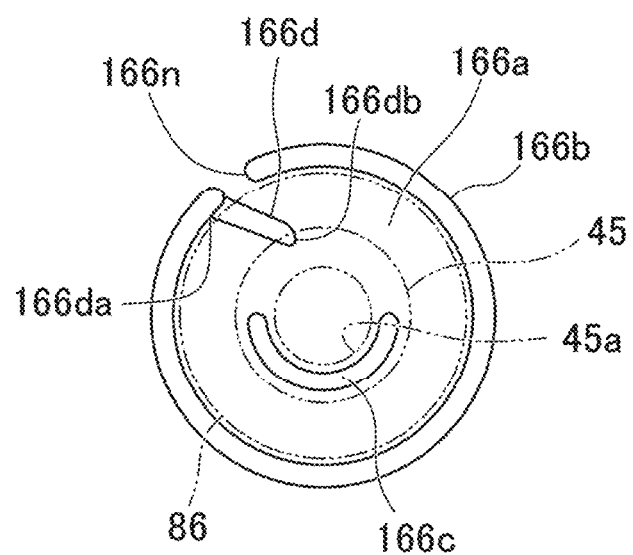
FIG. 7 is a plan view illustrating a first bearing holder portion of a first modification.

Next, the configuration of a first bearing holder portion 166 of the first modification that can be used in the above-described embodiment will be described with reference to FIG. 7. Note that components identical to those of the above-described embodiment are denoted by the same reference numeral, and the description will be omitted.

As in the above embodiment, the first bearing holder portion 166 of this modification includes a first facing face 166a, a first holding tubular portion 166b that protrudes from the first facing face 166a one side (−Y side) in the axial direction, and a first rib 166c and a second rib 166d located inside the first holding tubular portion 166b and protruding one side in the axial direction from the first facing face 166a. Further, similarly to the above-described embodiment, the first holding tubular portion 166b of the first bearing holder portion 166 has a cutout portion 166n.

The first rib 166c extends in a concave shape that opens upward. The first rib 166c curves in an arc shape about the central axis J2 below the central axis J2. Both ends of the first rib 166c are disposed radially inside relative to the inner peripheral face of the first holding tubular portion 166b. Both ends of the first rib 166c face the inner peripheral face of the first holding tubular portion 166b via a gap.

One end 166da of the second rib 166d is connected to the inner peripheral face of the first holding tubular portion 166b under the cutout portion 166n. The second rib 166d extends linearly inward from the inner peripheral face of the first holding tubular portion 166b. The second rib 166d inclines downward as it moves away from the inner peripheral face of the first holding tubular portion 166b. The other end 166db of the second rib 166d is located directly above the opening of the first rib 166c. In the present embodiment, the protruding height of the second rib 166d is equal to the protruding height of the first rib 166c. The protruding height of the second rib 166d may be lower than the protruding height of the first rib 166c.

The second rib 166d of this modification can guide the oil O that has flowed into the inside of the first holding tubular portion 166b from the cutout portion 166n directly above the first rib 166c. As a result, the oil O can be sufficiently retained in the opening of the first rib 166c, and the oil O can be efficiently guided to the inside of the counter shaft 45 as in the above-described embodiment.

The first bearing holder portion 166 of this modification may also be provided with the oil guide 47 as in the above-described embodiment. In this case, the distal end of the first rib first rib 166c comes into contact with the oil guide 47.

Figure 8:
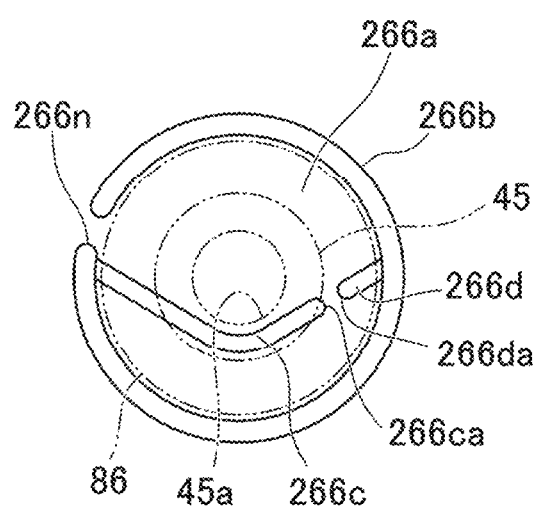
FIG. 8 is a plan view illustrating a first bearing holder portion of a second modification.

Next, the configuration of a first bearing holder portion 266 of the second modification that can be used in the above-described embodiment will be described with reference to FIG. 8. Note that components identical to those of the above-described embodiment are denoted by the same reference numeral, and the description will be omitted.

As in the above embodiment, the first bearing holder portion 266 of this modification includes a first facing face 266a, a first holding tubular portion 266b that protrudes from the first facing face 266a one side (−Y side) in the axial direction, and a first rib 266c and a seventh rib 266d located inside the first holding tubular portion 266b and protruding one side in the axial direction from the first facing face 266a. Further, similarly to the above-described embodiment, the first holding tubular portion 266b of the first bearing holder portion 266 has a cutout portion 266n.

The first rib 266c extends in a concave shape that opens upward. The first rib 266c curves in an arc shape about the central axis J2 below the central axis J2. The one end portion 266ca of the first rib 266c in the extending direction faces the inner peripheral face of the first holding tubular portion 266b via a gap. On the other hand, the other end portion of the first rib 266c in the extending direction is connected to the inner peripheral face of the first holding tubular portion 266b under the cutout portion 266n.

The seventh rib 266d extends linearly. It is disposed on the extension line of the first rib 266c in the extending direction on the one end portion 266ca side of the first rib 266c. The one end portion 266da of the seventh rib 266d in the extending direction faces the one end portion 266ca of the first rib 266c via a gap. On the other hand, the other end portion of the seventh rib 266d in the extending direction is connected to the inner peripheral face of the first holding tubular portion 266b.

According to this modification, part of the oil O that has flowed into the opening of the first rib 266c from the cutout portion 266n can be supplied below the first rib 266c from a gap between the one end portion 266ca of the first rib 266c and the one end portion 266da of the seventh rib 266d. The oil O flowing below the first rib 266c collects in the lower region inside the first holding tubular portion 266b and is supplied to the first bearing 86. Such an effect is an effect obtained when at least one of the one end portion 266ca of the first rib 266c in the extending direction or the other end portion in the extending direction faces each other through a gap without being connected to the inner peripheral face of the first holding tubular portion 266b.

Although various embodiments of the present invention are described above, structures in the embodiments and a combination of the embodiments are examples, and thus addition, elimination, replacement of structure, and other modifications can be made within a range without departing from the spirit of the present invention. Then, the present invention is not limited by the embodiments.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A transmission mechanism device, comprising:
    a transmission mechanism including
        a plurality of gears,
        a first shaft, and
        a first bearing supporting the first shaft;
    a housing that accommodates the transmission mechanism and has a first bearing holder portion on an inner face of the housing, the housing including
        a motor chamber,
        a gear chamber, and
        a partition wall that partitions the motor chamber and the gear chamber;
    oil that is collected in a lower region inside the housing;
    a catch tank that is disposed in the housing and opens upward;
    an oil pump that is disposed in the housing; and
    a first path that is disposed in the housing and connects the oil pump and the catch tank, wherein at least a part of the first path is provided in the partition wall, wherein
    the first bearing holder portion has a holding tubular portion that holds the first bearing from radially outside,
    the holding tubular portion has a cutout portion that connects an inside and outside of the holding tubular portion,
    a flow passage including the cutout portion is provided on the inner face of the housing,
    the catch tank includes
        a reservoir, and
        a feed portion extending from an inside of the reservoir to the holding tubular portion,
    the feed portion has a distal end portion inserted into the flow passage,
    the plurality of gears includes
        a first gear that is disposed around a motor axis,
        a ring gear that is disposed around an output axis parallel to the motor axis, and
        a second gear that is between the first gear and the ring gear in a front-rear direction and provided on the first shaft, and rotates about a central axis being above the motor axis, and
    the first path overlaps the second gear in the front-rear direction.

2. The transmission mechanism device according to claim 1, wherein
    the feed portion has
        the distal end portion, and
        a relay portion that connects the reservoir and the distal end portion,
    the feed portion has a gutter shape having a bottom plate and a pair of side plates, and
    the distal end portion is smaller than the relay portion in at least one dimension of a width dimension of the bottom plate and a height dimension of the pair of side plates.

3. The transmission mechanism device according to claim 2, wherein of the pair of side plates of the distal end portion, one side plate facing the inner face of the housing has a smaller height dimension than the other side plate.

4. The transmission mechanism device according to claim 1, wherein
    the reservoir has a plurality of wall portions including
        a fixed wall portion extending along the inner face of the housing and fixed to the inner face, and
        a side wall portion connected to the fixed wall portion, and
    the feed portion extends from the side wall portion.

5. The transmission mechanism device according to claim 1, wherein
    the reservoir includes
        a first bottom portion located above an upper end position of the ring gear included in the plurality of gears and disposed so as to overlap the ring gear when viewed from an up-down direction and
        a second bottom portion located below the upper end position of the ring gear.

6. The transmission mechanism device according to claim 1, wherein
    part of the catch tank and the housing are separate members, and
    part of the catch tank is fixed to the inner face of the housing.

7. The transmission mechanism device according to claim 1, wherein
    the catch tank includes
        an outflow portion located above a bottom face of the reservoir and allowing the oil to flow out of the reservoir, and
        a sub-reservoir located downstream of the outflow portion and retaining the oil.

8. The transmission mechanism device according to claim 7, wherein
- at least part of the sub-reservoir is the inner face of the housing,
- at least part of the sub-reservoir is a covering plate disposed to face the inner face of the housing, and
- at least part of the sub-reservoir is disposed so as to overlap the ring gear when viewed from an axial direction of the first shaft.

9. The transmission mechanism device according to claim 1, wherein
- the transmission mechanism includes
  - an output shaft extending in parallel with the first shaft, and
  - an output shaft bearing that supports an outer peripheral face of the output shaft,
- an output shaft bearing holder portion that holds the output shaft bearing is provided on the inner face of the housing,
- the reservoir includes a first ejection portion, and
- a first supply path connecting the first ejection portion and the output shaft bearing is provided in an internal space of the housing.

10. The transmission mechanism device according to claim 1, wherein
- a motor has a rotor shaft that rotates about the motor axis,
- the housing rotatably supports the rotor shaft via a rotor shaft bearing,
- the catch tank includes a second ejection portion from which the oil in the reservoir is ejected, and
- a second supply path for supplying the oil ejected from the second ejection portion to the rotor shaft bearing is provided in an internal space of the housing.

11. The transmission mechanism device according to claim 10, wherein
- the transmission mechanism includes
  - a second shaft, and
  - an output shaft extending in parallel with the first shaft,
- the first shaft is disposed between the second shaft and the output shaft in a direction orthogonal to a direction of gravity, when viewed from an axial direction of the first shaft,
- a sub-tank portion that opens upward is provided opposite the catch tank with the first shaft interposed therebetween in the internal space of the housing, and
- the second supply path has
  - a first sub-path extending from the catch tank to the sub-tank portion and
  - a second sub-path extending from the sub-tank portion to the rotor shaft bearing.

12. A drive device, comprising:
- the transmission mechanism device according to claim 1; and
- a motor configured to transmit power to the transmission mechanism.

13. The transmission mechanism device according to claim 1, wherein
- at least a part of the catch tank overlaps the ring gear in an axial direction of the first shaft.

14. A transmission mechanism device, comprising:
- a transmission mechanism including
  - a plurality of gears,
  - a first shaft, and
  - a first bearing supporting the first shaft;
- a housing that accommodates the transmission mechanism and has a first bearing holder portion on an inner face of the housing;
- oil that is collected in a lower region inside the housing; and
- a catch tank that is disposed in the housing and opens upward, wherein
- the first bearing holder portion has a holding tubular portion that holds the first bearing from radially outside,
- the holding tubular portion has a cutout portion that connects an inside and outside of the holding tubular portion,
- a flow passage including the cutout portion is provided on the inner face of the housing,
- the catch tank includes
  - a reservoir, and
  - a feed portion extending from an inside of the reservoir to the holding tubular portion, the feed portion has a distal end portion inserted into the flow passage,
- the transmission mechanism further includes
  - a second shaft, and
  - an output shaft extending in parallel with the first shaft,
- the first shaft is disposed between the second shaft and the output shaft in a direction orthogonal to a direction of gravity, when viewed from an axial direction of the first shaft,
- a sub-tank portion that opens upward is provided opposite the catch tank with the first shaft interposed therebetween in an internal space of the housing, and
- a second supply path for supplying the oil is provided in the internal space of the housing, and has
  - a first sub-path extending from the catch tank to the sub-tank portion and
  - a second sub-path extending from the sub-tank portion to a rotor shaft bearing.

* * * * *